(12) United States Patent
Ikeda

(10) Patent No.: US 10,551,591 B2
(45) Date of Patent: Feb. 4, 2020

(54) IMAGING APPARATUS, CONTROL METHOD OF IMAGING APPARATUS, AND STORAGE MEDIUM STORING CONTROL PROGRAM OF IMAGING APPARATUS FOR PERFORMING FOCUS DETECTION AND DISPLAY

(71) Applicant: Olympus Corporation, Hachioji-shi, Tokyo (JP)

(72) Inventor: Makoto Ikeda, Kunitachi (JP)

(73) Assignee: Olympus Corporation, Tokyo (JP)

( * ) Notice: Subject to any disclaimer, the term of this patent is extended or adjusted under 35 U.S.C. 154(b) by 23 days.

(21) Appl. No.: 15/791,316

(22) Filed: Oct. 23, 2017

(65) Prior Publication Data

US 2018/0113278 A1    Apr. 26, 2018

(30) Foreign Application Priority Data

Oct. 24, 2016  (JP) ................. 2016-207983

(51) Int. Cl.
*G02B 7/34* (2006.01)
*H04N 5/225* (2006.01)
*H04N 5/3745* (2011.01)
*H04N 5/378* (2011.01)

(52) U.S. Cl.
CPC ......... *G02B 7/346* (2013.01); *H04N 5/225* (2013.01); *H04N 5/378* (2013.01); *H04N 5/37452* (2013.01); *H04N 5/37455* (2013.01); *H04N 5/37457* (2013.01)

(58) Field of Classification Search
CPC ..................................... G02B 7/346
See application file for complete search history.

(56) References Cited

U.S. PATENT DOCUMENTS 9,667,882 B2 * 5/2017 Matsuoka ............ H04N 5/2355
9,912,889 B2 * 3/2018 Taniguchi .............. G02B 7/34
(Continued)

FOREIGN PATENT DOCUMENTS

CN       104427265 A    3/2015
JP       2015-046761    3/2015

OTHER PUBLICATIONS

First Office Action to corresponding Chinese Patent Application No. 201710993030.0, dated Oct. 9, 2019 (7 pgs.), with translation (12 pgs.).

*Primary Examiner* — Cynthia Segura
(74) *Attorney, Agent, or Firm* — John C. Pokotylo; Pokotylo Patent Services

(57) ABSTRACT

An imaging apparatus includes a pixel array, a first adder, a second adder, a first A/D converter circuit, and a second A/D converter circuit. The pixel array includes a plurality of pairs of first pixels and second pixels. Each pair of the first pixel and the second pixel receives a light flux passing through a photography optical system by pupil-dividing the light flux. The first adder adds outputs of the first pixels and outputs of the second pixels. The second adder generates a first output by adding the outputs of the first pixels and generates a second output by adding the outputs of the second pixels. The first A/D converter circuit converts an output of the first adder to a digital signal. The second A/D converter circuit converts an output of the second adder to a digital signal.

12 Claims, 18 Drawing Sheets

(56) References Cited

U.S. PATENT DOCUMENTS

| | | | |
|---|---|---|---|
| 2007/0279506 A1* | 12/2007 | Sato | H04N 5/335 |
| | | | 348/302 |
| 2008/0024345 A1* | 1/2008 | Watson | H03M 1/12 |
| | | | 341/155 |
| 2013/0001402 A1* | 1/2013 | Ogushi | H04N 5/3456 |
| | | | 250/208.1 |
| 2013/0201383 A1* | 8/2013 | Okado | G02B 7/34 |
| | | | 348/345 |
| 2013/0229555 A1* | 9/2013 | Hashimoto | H04N 5/378 |
| | | | 348/300 |
| 2014/0368703 A1* | 12/2014 | Yao | H04N 5/378 |
| | | | 348/295 |
| 2015/0009383 A1* | 1/2015 | Fujii | H04N 5/347 |
| | | | 348/302 |
| 2015/0062394 A1* | 3/2015 | Ikeda | H04N 5/347 |
| | | | 348/301 |
| 2015/0256778 A1* | 9/2015 | Kusaka | G03B 13/36 |
| | | | 348/302 |
| 2016/0198105 A1* | 7/2016 | Kawai | G03B 13/36 |
| | | | 348/251 |
| 2016/0301853 A1* | 10/2016 | Takeuchi | H04N 5/23212 |
| 2016/0316158 A1* | 10/2016 | Uchida | H04N 5/3696 |
| 2016/0337578 A1* | 11/2016 | Kikuchi | H04N 5/23212 |
| 2019/0068910 A1* | 2/2019 | Taniguchi | H04N 5/37455 |
| 2019/0109994 A1* | 4/2019 | Kikuchi | H04N 5/232122 |

\* cited by examiner

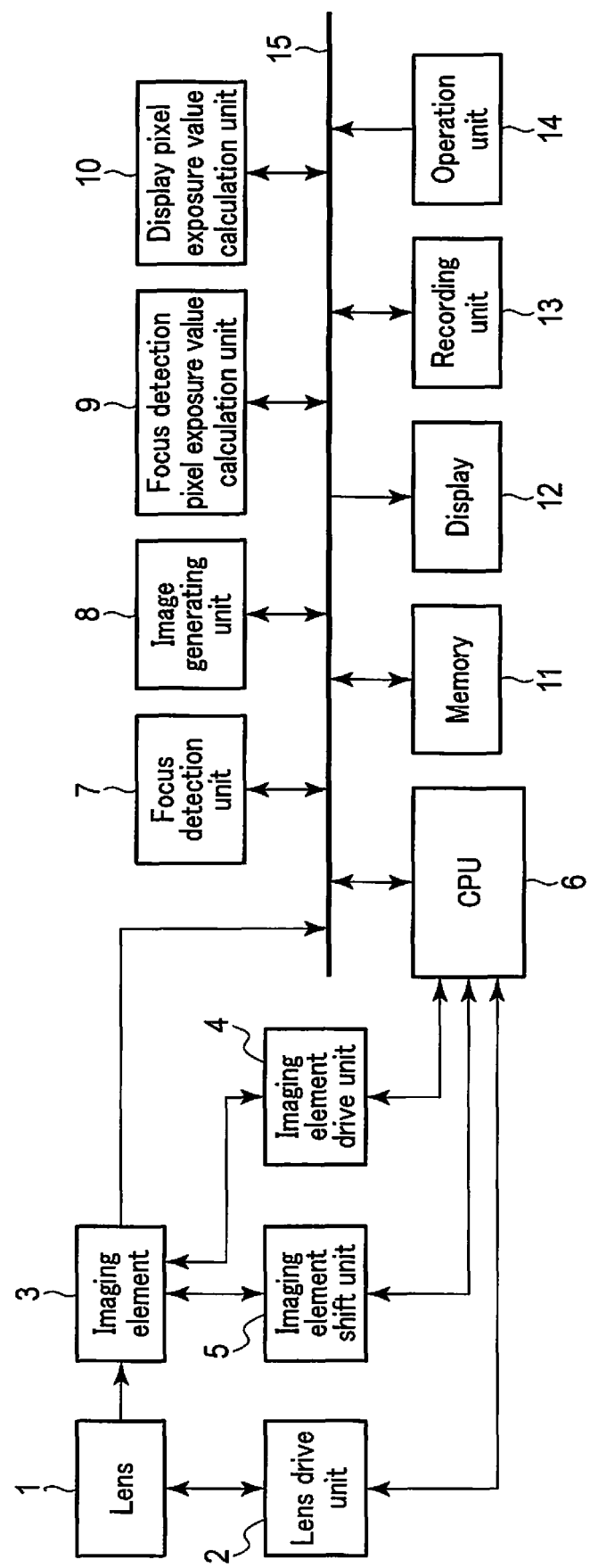
F I G. 1

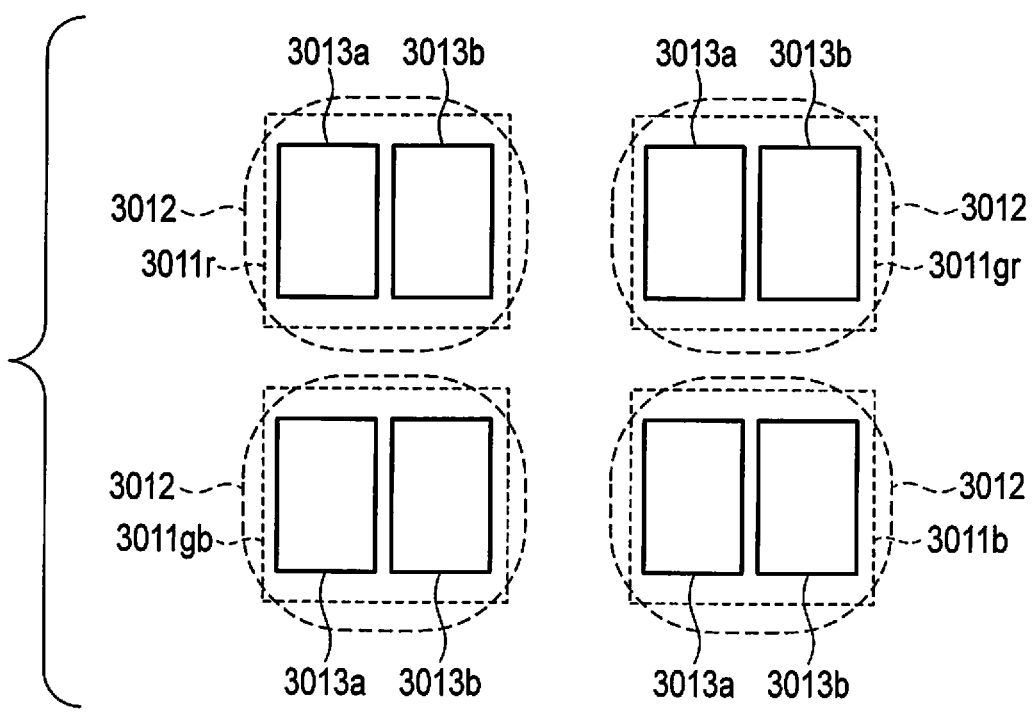
F I G. 3

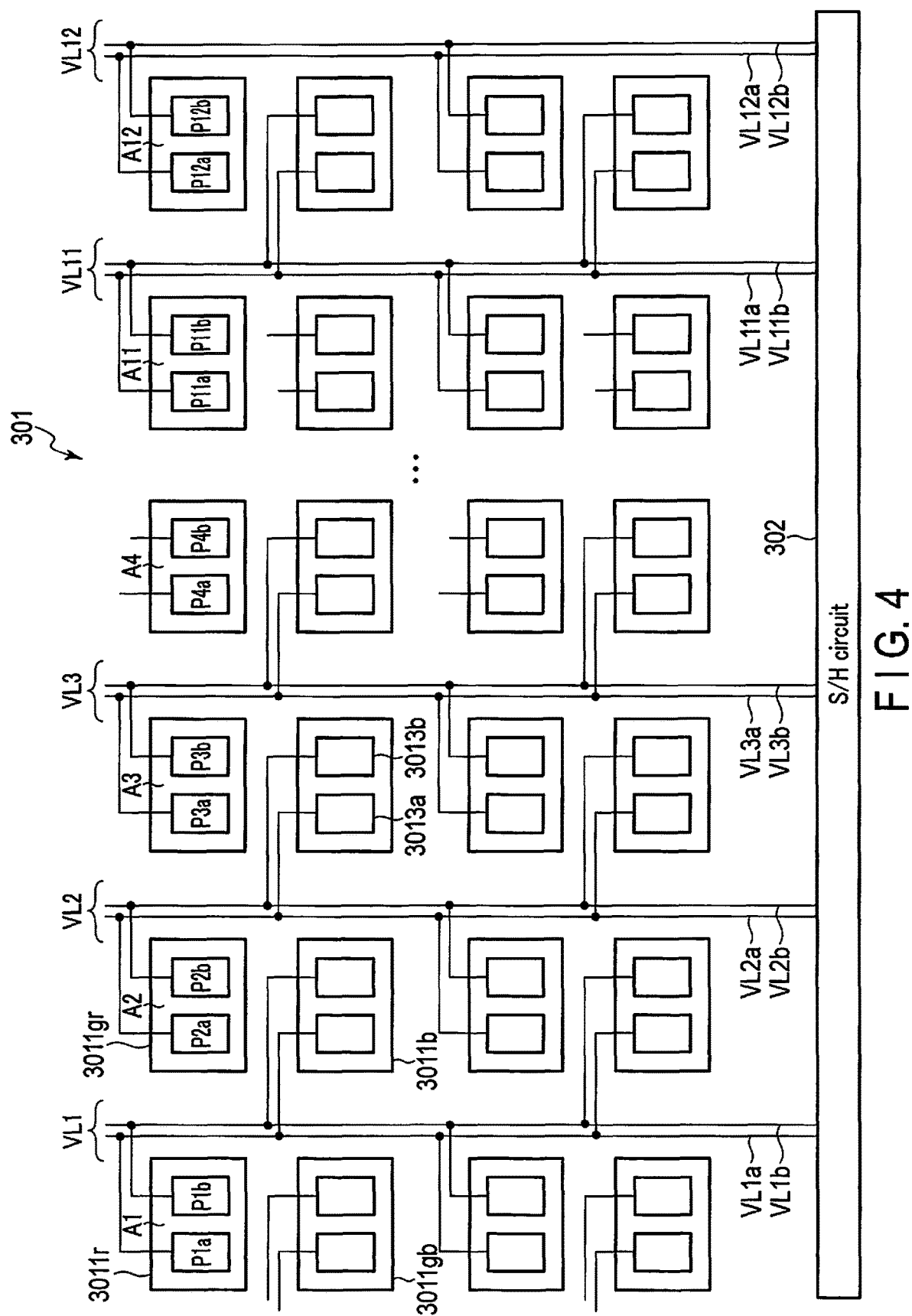
F I G. 4

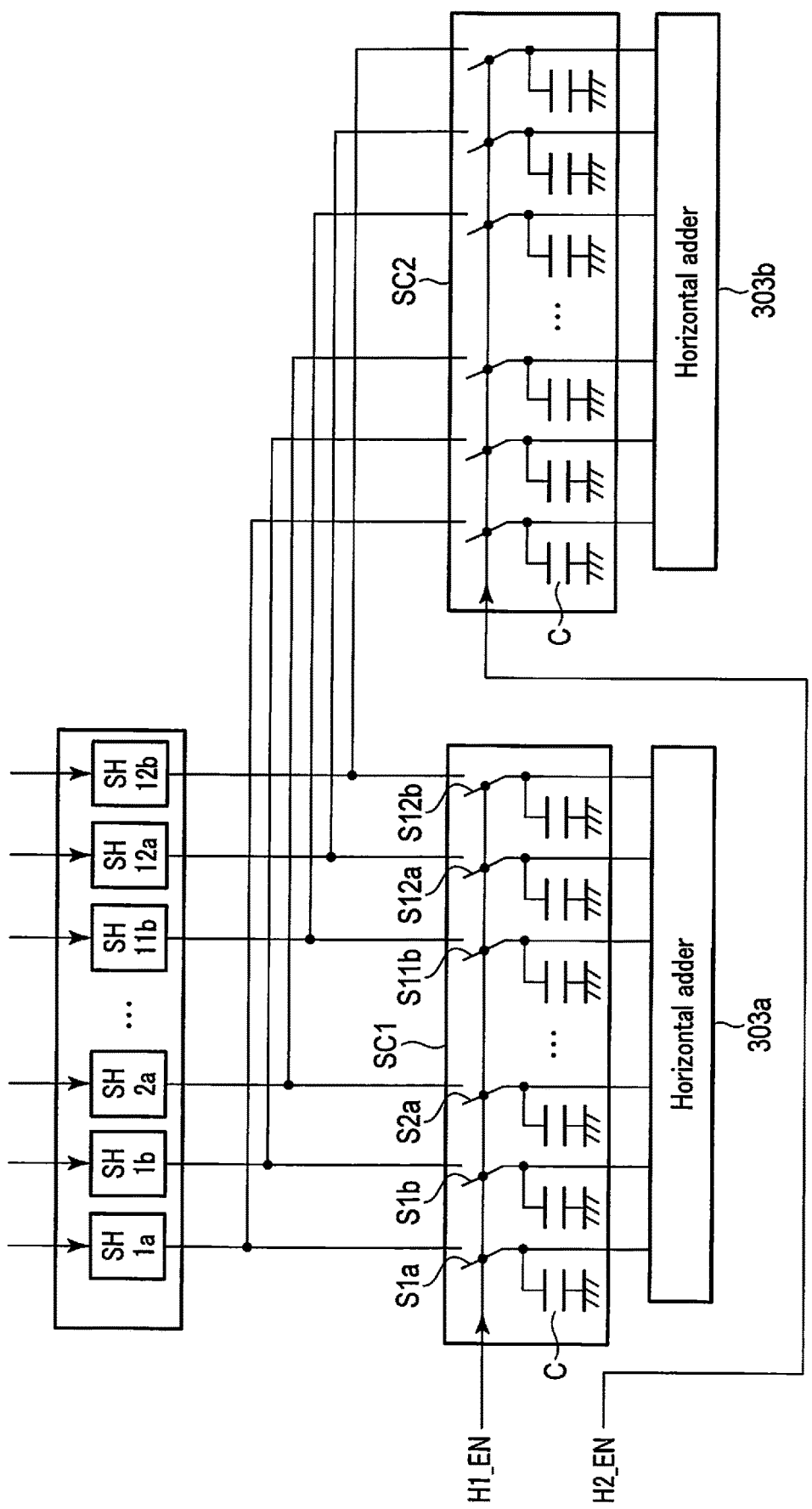
F I G. 6

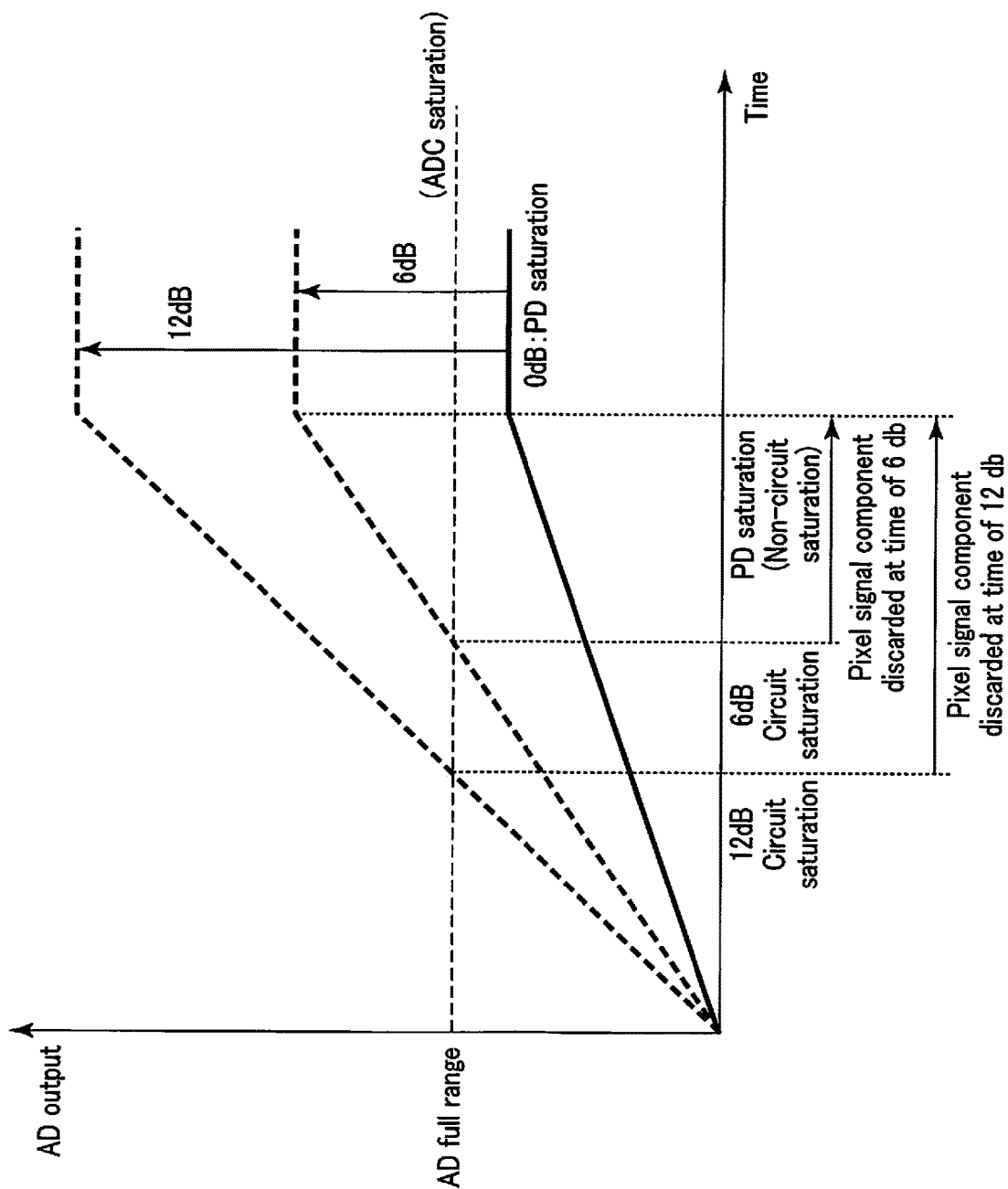
F I G. 10

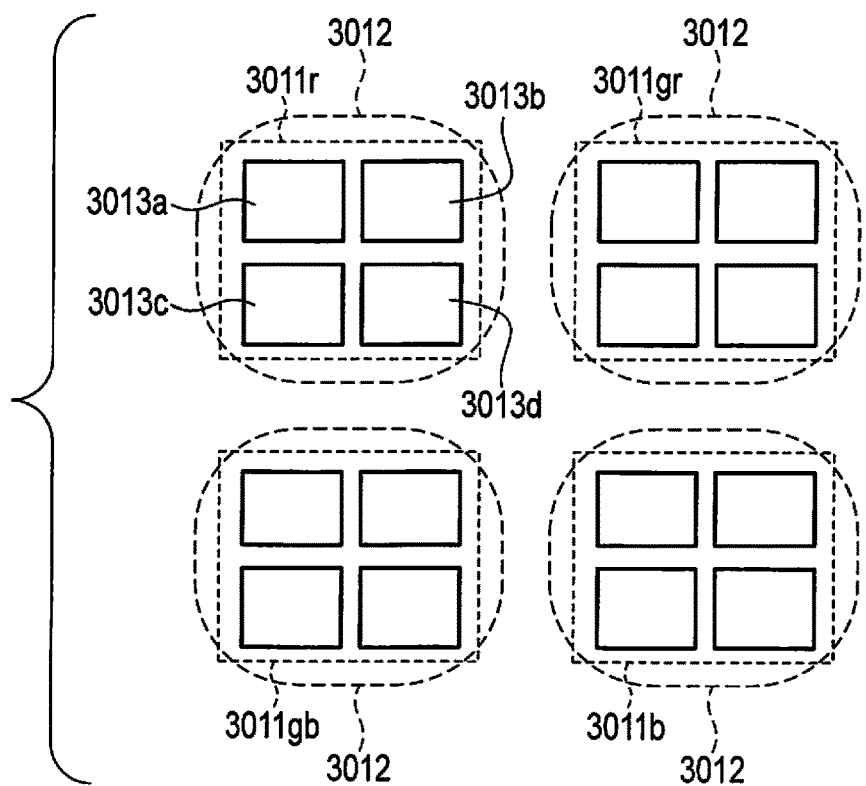
F I G. 17
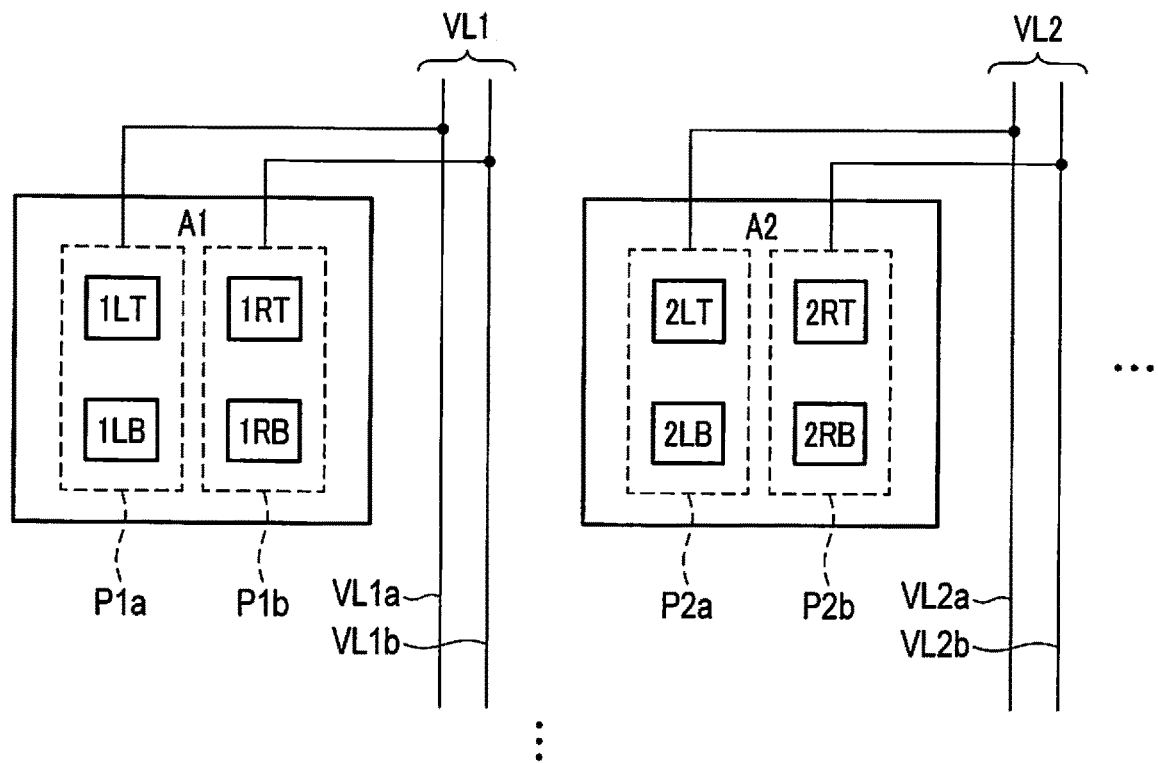
F I G. 18

IMAGING APPARATUS, CONTROL METHOD OF IMAGING APPARATUS, AND STORAGE MEDIUM STORING CONTROL PROGRAM OF IMAGING APPARATUS FOR PERFORMING FOCUS DETECTION AND DISPLAY

CROSS-REFERENCE TO RELATED APPLICATIONS

This application is based upon and claims the benefit of priority from the prior Japanese Patent Application No. 2016-207983, filed Oct. 24, 2016, the entire contents of which are incorporated herein by reference.

BACKGROUND OF THE INVENTION

1. Field of the Invention

The present invention relates to an imaging apparatus, a control method of the imaging apparatus, and a storage medium storing a control program of the imaging apparatus.

2. Description of the Related Art

In recent years, there has been proposed an imaging apparatus configured to be capable of executing phase detection AF without using an additional focus detection sensor, by using some pixels of an imaging element as focus detection pixels for focus detection by a phase difference detection method. As a configuration of the focus detection pixel, there is known a configuration in which a part of a light receiving area of the pixel is shielded. An output level of the focus detection pixel with this configuration is lower than an output level of a non-focus-detection pixel. Accordingly, in order to use the focus detection pixel as a display pixel, a correction process of a pixel signal of the focus detection pixel is necessary. In addition, when some pixels of the imaging element are used as focus detection pixels, in order to secure a focus detection performance, it is necessary to densely arrange the focus detection pixels. On the other hand, if the density of focus detection pixels increases, there is a possibility that the correction process of the pixel signals cannot correctly be executed.

Besides, as regards display pixels, in order to obtain an optimal frame rate for display, a pixel addition process or a pixel thinning-out process is often performed. However, it is difficult to match the disposition of focus detection pixels and the cycle of pixel addition. Thus, while a live view is being executed, if an attempt is made to also execute focus detection using focus detection pixels, it becomes necessary to individually read out pixel addition data and focus detection data.

As a configuration of focus detection pixels for enabling focus detection using focus detection pixels during the live view, there is known a configuration in which a pair of pixels are provided so as to correspond to one micro lens. For example, in an imaging apparatus proposed in Jpn. Pat. Appln. KOKAI Publication No. 2015-046761, a pixel signal from one of a pair of pixels (for example, a left pixel), and an addition signal, in which pixel signals of both of the pair of pixels are added, are read out. In the imaging apparatus proposed in Jpn. Pat. Appln. KOKAI Publication No. 2015-046761, a pixel signal of the other (for example, a right pixel) of the pair of pixels is acquired from a difference between the addition signal and the left pixel signal. By doing so, the imaging apparatus of Pat. Appln. KOKAI Publication No. 2015-046761 suppresses a decrease in frame rate and an increase in data rate in the case of performing focus detection using focus detection pixels during the live view.

BRIEF SUMMARY OF THE INVENTION

According to a first aspect of the invention, there is provided an imaging apparatus comprising: a pixel array in which a plurality pixels that generate electric charges based on incident light are arranged in a row direction and a column direction, the pixel array including a plurality of pairs of first pixels and second pixels, each pair of the first pixel and the second pixel being configured to receive a light flux passing through a photography optical system by pupil-dividing the light flux; a first adder configured to add outputs of the first pixels and outputs of the second pixels, the first pixels and the second pixels being arranged in a direction of the pupil-dividing; a second adder configured to generate a first output by adding the outputs of the first pixels arranged in the direction of the pupil-dividing, and configured to generate a second output by adding the outputs of the second pixels arranged in the direction of the pupil-dividing; a first A/D converter circuit configured to convert an output of the first adder to a digital signal; and a second A/D converter circuit configured to convert an output of the second adder to a digital signal.

According to a second aspect of the invention, there is provided a control method of an imaging apparatus comprising a pixel array in which a plurality pixels that generate electric charges based on incident light are arranged in a row direction and a column direction, the pixel array including a plurality of pairs of first pixels and second pixels, each pair of the first pixel and the second pixel being configured to receive a light flux passing through a photography optical system by pupil-dividing the light flux; a first adder configured to add outputs of the first pixels and outputs of the second pixels, the first pixels and the second pixels being arranged in a direction of the pupil-dividing; a second adder configured to generate a first output by adding the outputs of the first pixels arranged in the direction of the pupil-dividing, and configured to generate a second output by adding the outputs of the second pixels arranged in the direction of the pupil-dividing; a first A/D converter circuit configured to convert an output of the first adder to a digital signal; and a second A/D converter circuit configured to convert an output of the second adder to a digital signal, the control method comprising: generating image data for display or image data for recording, by using an output from the first A/D converter circuit; executing focus detection by a phase difference detection method, based on the first output and the second output from the second A/D converter circuit; and operating the first adder and the second adder in parallel at a time of generating the image data for display and an output for a focus detection calculation, based on an output of the pixel array.

According to a third aspect of the invention, there is provided a computer-readable, non-transitory storage medium having stored thereon a control program of an imaging apparatus comprising a pixel array in which a plurality pixels that generate electric charges based on incident light are arranged in a row direction and a column direction, the pixel array including a plurality of pairs of first pixels and second pixels, each pair of the first pixel and the second pixel being configured to receive a light flux passing through a photography optical system by pupil-dividing the light flux; a first adder configured to add outputs of the first pixels and outputs of the second pixels, the first pixels and the second pixels being arranged in a direction of the pupil-dividing; a second adder configured to generate a first output by adding the outputs of the first pixels arranged in the direction of the pupil-dividing, and configured to generate a second output by adding the outputs of the second pixels arranged in the direction of the pupil-dividing; a first A/D converter circuit configured to convert an output of the first adder to a digital signal; and a second A/D converter circuit configured to convert an output of the second adder to a digital signal, the control program of the imaging apparatus comprising: generating image data for display or image data for recording, by using an output from the first A/D converter circuit; executing focus detection by a phase difference detection method, based on the first output and the second output from the second A/D converter circuit; and operating the first adder and the second adder in parallel at a time of generating the image data for display and an output for a focus detection calculation, based on an output of the pixel array.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram illustrating the configuration of an example of an imaging apparatus according to an embodiment of the present invention.

FIG. 3 is an enlarged view of pixel areas.

FIG. 4 is a view illustrating a first example of a connection configuration between a pixel array and an S/H circuit.

FIG. 6 is a view illustrating an example of the connection configuration between the S/H circuit and horizontal adders.

FIG. 10 is a graph showing a relationship between a setting of an analog gain for a pixel signal for focus detection, and an output of an ADC/gain circuit.

FIG. 17 is an enlarged view of a pixel area of Modification 5.

FIG. 18 is a view illustrating a first example of a connection configuration between a pixel array and vertical signal line groups at a time when four pixels are disposed in one pixel area.

DETAILED DESCRIPTION OF THE INVENTION

Figure 2:
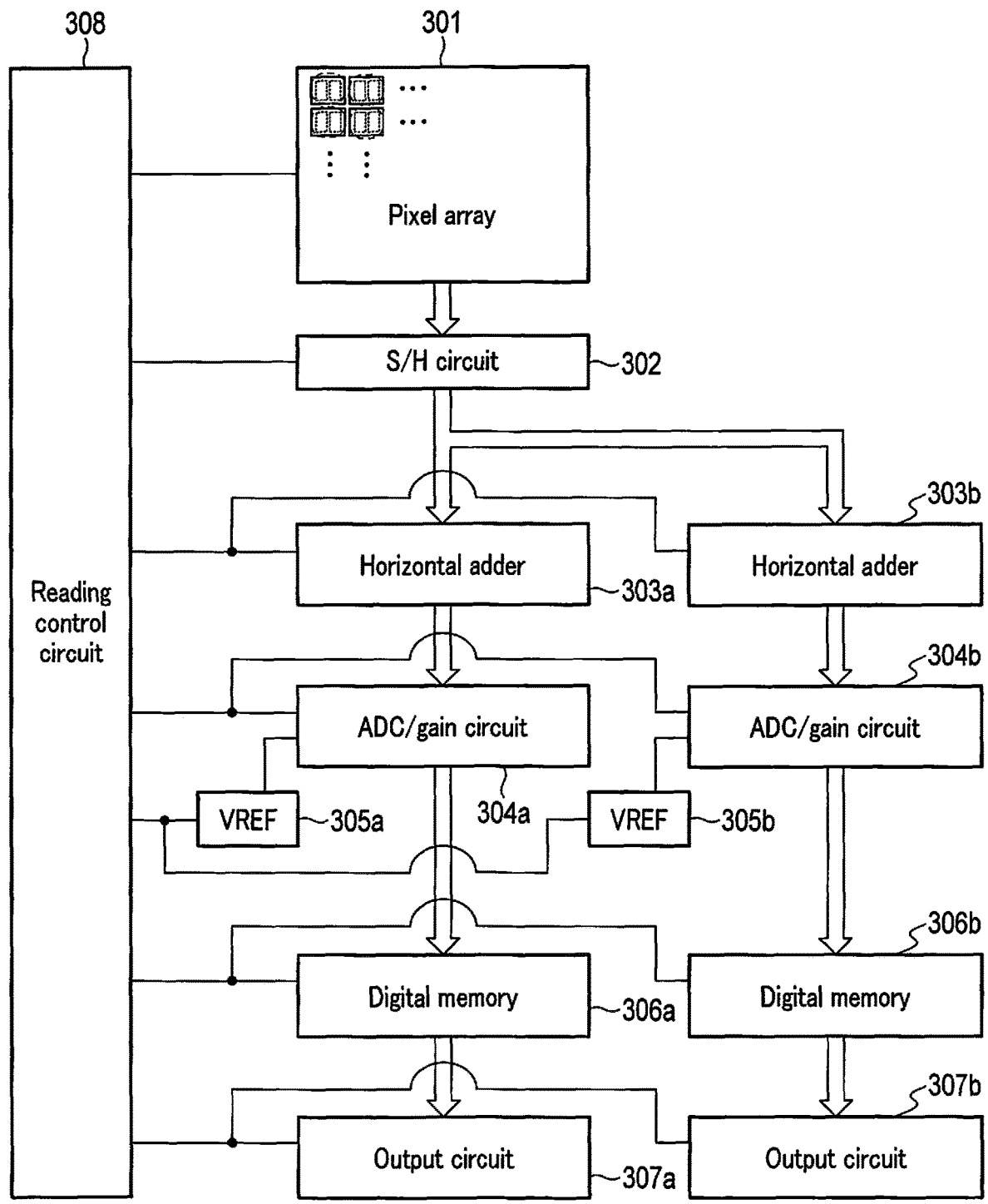
FIG. 2 is a view illustrating the configuration of an imaging element.

Embodiments of the present invention will be described hereinafter with reference to the accompanying drawings. FIG. 1 is a block diagram illustrating the configuration of an example of an imaging apparatus according to an embodiment of the present invention. Examples of the imaging apparatus include various kinds of imaging apparatuses with focus lenses, in addition to such devices as digital cameras and smartphones.

As illustrated in FIG. 1, the imaging apparatus includes a lens 1, a lens drive unit 2, an imaging element 3, an imaging element drive unit 4, an imaging element shift unit 5, a CPU 6, a focus detection unit 7, an image generating unit 8, a focus detection pixel exposure value calculation unit 9, a display pixel exposure value calculation unit 10, a memory 11, a display 12, a recording unit 13, an operation unit 14, and a bus 15. Here, each of the blocks of the imaging apparatus is composed of, for example, hardware. However, it is not always necessary that all blocks are composed of hardware. A part of the blocks may be composed of software. In addition, each of the blocks of the imaging apparatus may not be composed of single hardware or software. Each of the blocks may be composed of a plurality of pieces of hardware or software.

The lens 1 is a photography optical system for guiding a light flux from a subject (not shown) to a light receiving surface of the imaging element 3. The lens 1 includes a focus lens. The focus lens is a lens for varying the focal position of the lens 1. The lens 1 may be composed as a zoom lens. In addition, the lens 1 may be configured to be attachable/detachable to/from the imaging apparatus.

The lens drive unit 2 is, for example, a motor for driving the focus lens. The lens drive unit 2 drives the focus lens by receiving a control signal from the CPU 6. When the lens 1 is composed as a zoom lens, the lens drive unit 2 also performs zoom driving. Besides, the lens drive unit 2 drives an aperture included in the lens 1.

The imaging element 3 includes a plurality of pixels which accumulate electric charges in accordance with incident light. This imaging element 3 outputs the charge accumulated in each pixel as a digital electric signal (hereinafter referred to as "pixel signal"). The configuration of the imaging element 3 will be described later in detail.

The imaging element drive unit 4 drives the imaging element 3 by receiving a control signal from the CPU 6. The accumulation amount of the charge in each pixel in the imaging element 3 is adjusted by the imaging element drive unit 4.

The imaging element shift unit 5 is configured to hold the imaging element 3, and configured to be capable of freely moving the imaging element 3 in a direction parallel to the light receiving surface of the imaging element 3. By receiving a control signal from the CPU 6, this imaging element shift unit 5 moves the imaging element 3 in a plane parallel to the light receiving surface of the imaging element 3. The imaging element shift unit 5 is used for a camera shake correction process and a super-resolution process.

The CPU 6 is a control circuit for controlling the operation of the imaging apparatus. For example, the CPU 6 controls a focal point adjusting operation of the focus lens. It is not always necessary that the CPU 6 be composed as a CPU. Specifically, the same function as that of the CPU 6 may be realized by an ASIC, FPGA, etc. In addition, the same function as that of the CPU 6 may be realized by software.

The focus detection unit 7 calculates a defocus amount as information for focal point detection by phase difference detection, based on image signals which are output from the pixels of the imaging element 3. As will be described later in detail, the pixels of the imaging elements 3 are classified into pixels functioning as a first pixel group which receives a light flux emitted from one of a pair of pupils of the lens 1, and pixels functioning as a second pixel group which receives a light flux from the other of the pair of pupils. The defocus amount is calculated from a phase difference between pixel signals output from the pixels as the first pixel group, and pixel signals output from the pixels as the second pixel group. Based on the defocus amount calculated by the focus detection unit 7, the CPU 6 controls the lens drive unit 2, thereby performing the focal point adjustment of the lens 1.

The image generating unit 8 generates image data which is used for display or for recording, by performing an image process on the pixel signals which are output from the pixels of the imaging element 3. This image process includes a white balance correction process, a color correction process, a gamma (γ) correction process, etc. In addition, the image generating unit 8 executes various processes necessary for focus detection, for example, with respect to focus detection pixels.

The focus detection pixel exposure value calculation unit 9 calculates an exposure amount of a pixel signal for focus detection, for example, based on a subject luminance. This exposure amount of the pixel signal for focus detection is an exposure amount at a time of using the pixel signal of the imaging element 3 as an image signal for focal point detection by a phase difference detection method. The display pixel exposure value calculation unit 10 calculates an exposure amount of a pixel signal for display, for example, based on a subject luminance. This exposure amount of the pixel signal for display is an exposure amount at a time of using the pixel signal as an image signal for display or recording. The CPU 6 controls the exposure amounts of the respective pixels of the imaging element 3 by setting analog gains for display and focus detection of the imaging element 3 in accordance with the exposure amount of the pixel signal for focus detection and the exposure amount of the pixel signal for display.

The memory 11 is, for example, a RAM. The memory 11 temporarily stores various kinds of data, such as image data generated by the image generating unit 8, the defocus amount calculated by the focus detection unit 7, the exposure amount for focus detection which is calculated by the focus detection pixel exposure value calculation unit 9, and the exposure amount for display which is calculated by the display pixel exposure value calculation unit 10.

The display 12 is, for example, a liquid crystal display (LCD). The display 12 displays various kinds of images, such as an image based on the image data for display.

The recording unit 13 is, for example, a flash ROM. Programs and parameters, which are necessary for the operation of the imaging apparatus, are recorded in the recording unit 13. In addition, image files, which are created by the CPU 6 based on the image data for recording, are recorded in the recording unit 13.

The operation unit 14 is various kinds of operation members which are operated by a user. The operation unit 14 includes, for example, a release button, a movie button, a mode button, a select key, a power button, etc. The release button is an operation member for instructing still image photography. The movie button is an operation member for instructing movie photography. The mode button is an operation member for selecting a photography setting of the imaging apparatus. The select key is an operation member for selecting or determining, for example, an item on a menu screen. The power button is an operation member for turning on or off the supply of power to the imaging apparatus.

The bus 15 is connected to the CPU 6, focus detection unit 7, image generating unit 8, focus detection pixel exposure value calculation unit 9, display pixel exposure value calculation unit 10, memory 11, display 12, recording unit 13 and operation unit 14. The bus 15 functions as a transfer path for transferring various data within the imaging apparatus.

Next, the imaging element 3 will be further described. FIG. 2 is a view illustrating the configuration of the imaging element 3. As illustrated in FIG. 2, the imaging element 3 includes a pixel array 301, a sample/hold (S/H) circuit 302, horizontal adders 303*a* and 303*b*, ADC/gain circuits 304*a* and 304*b*, reference power supplies (VREF) 305*a* and 305*b*, digital memories 306*a* and 306*b*, output circuits 307*a* and 307*b*, and a reading control circuit 308.

The pixel array 301 includes a plurality of pixel areas arranged in a row direction and a column direction. The pixel array 301 generates electric charges corresponding to light fluxes incident on the respective pixel areas via the lens 1. FIG. 3 is an enlarged view of the pixel areas. The pixel areas are provided in accordance with the arrangement of color filters. For example, FIG. 3 is an enlarged view of pixel areas at a time when the arrangement of color filters is Bayer arrangement. At this time, one pixel area is provided for each of an R filter 3011*r*, a Gr filter 3011*gr*, a Gb filter 3011*gb* and a B filter 3011*b*. It is not always necessary that the arrangement of color filters be the Bayer arrangement.

In each of the pixel areas, a micro lens 3012, and two pixels 3013*a* and 3013*b*, which are disposed in a direction (e.g. horizontal direction) of pupil division, are formed. The micro lens 3012 is formed in order to converge light fluxes, which have passed through the lens 1, onto the corresponding pixels. Each of the pixel 3013*a* and 3013*b* includes a photodiode (PD), and generates an electric charge corresponding to the light flux which has passed through the lens 1 and has been converged by the micro lens 3012. The pixel 3013*a*, which constitutes the first pixel group, is a pixel (hereinafter referred to as "left pixel") formed on the left side of the pixel area, and generates an electric charge corresponding to the light flux which has passed through the right-side pupil of the lens 1. The pixel 3013*b*, which constitutes the second pixel group, is a pixel (hereinafter referred to as "right pixel") formed on the right side of the pixel area, and generates an electric charge corresponding to the light flux which has passed through the left-side pupil of the lens 1.

The left pixel 3013a is provided on the left side of the pixel area, and the right pixel 3013b is provided on the right side of the pixel area. Thereby, a phase difference in the horizontal direction in the screen can be detected in the focus detection unit 7. On the other hand, it is possible to provide an upper pixel on the upper side of the pixel area, and to provide a lower pixel on the lower side of the pixel area. In this case, a phase difference in the vertical direction in the screen can be detected in the focus detection unit 7. Besides, two pixels may be provided in an oblique direction of the pixel area. In this case, a phase difference in the oblique direction in the screen can be detected in the focus detection unit 7.

The S/H circuit 302 temporarily holds an electric charge, which was generated in each pixel of the pixel array 301, as a pixel signal that is a voltage signal. FIG. 4 is a view illustrating a first example of a connection configuration between the pixel array 301 and the S/H circuit 302. In the example of FIG. 4, the pixel array 301 is composed of 12 columns of pixel areas A1 to A12. Needless to say, the number of columns of pixel areas, which are provided in the pixel array 301, is not limited to 12. For example, if the arrangement of color filters is the Bayer arrangement, the number of columns of pixel areas may be an arbitrary even number. Here, for the purpose of description, a left pixel provided in each pixel area is described as Pna (n=1, 2, . . . , 12), and a right pixel provided in each pixel area is described as Pnb (n=1, 2, . . . , 12).

The pixel array 301 and S/H circuit 302 are connected via vertical signal line groups VLn (n=1, 2, 3, . . . , 12), the number of which is equal to the number of pixel areas of one row. The vertical signal line groups are arranged such that pixel areas are interposed between vertical signal line groups which neighbor in the horizontal direction. Although not illustrated, vertical signal line groups are further provided on the left side of leftmost pixel areas A1. In addition, each of the vertical signal line groups VLn is composed of two vertical signal lines VLna and VLnb (n=1, 2, 3, . . . , 12). The vertical signal line VLna is connected to the corresponding left pixels Pna, and the vertical signal line VLnb is connected to the corresponding right pixels Pnb.

In the configuration of FIG. 4, pixels of orthogonally arranged pixel areas, among a pixel area corresponding to the R filter 3011r, a pixel area corresponding to the Gr filter 3011gr, a pixel area corresponding to the Gb filter 3011gb and a pixel area corresponding to the B filter 3011b, are connected to common vertical signal lines belonging to the same vertical signal line group. Specifically, the pixels of the pixel areas corresponding to the R filter 3011r and B filter 3011b are connected to corresponding vertical signal lines of an odd-numbered vertical signal line group VL1, VL3, . . . , VL11. In addition, the pixels of the pixel areas corresponding to the Gr filter 3011gr and Gb filter 3011gb are connected to corresponding vertical signal lines of an even-numbered vertical signal line group VL2, VL4, . . . , VL12.

Figure 5:
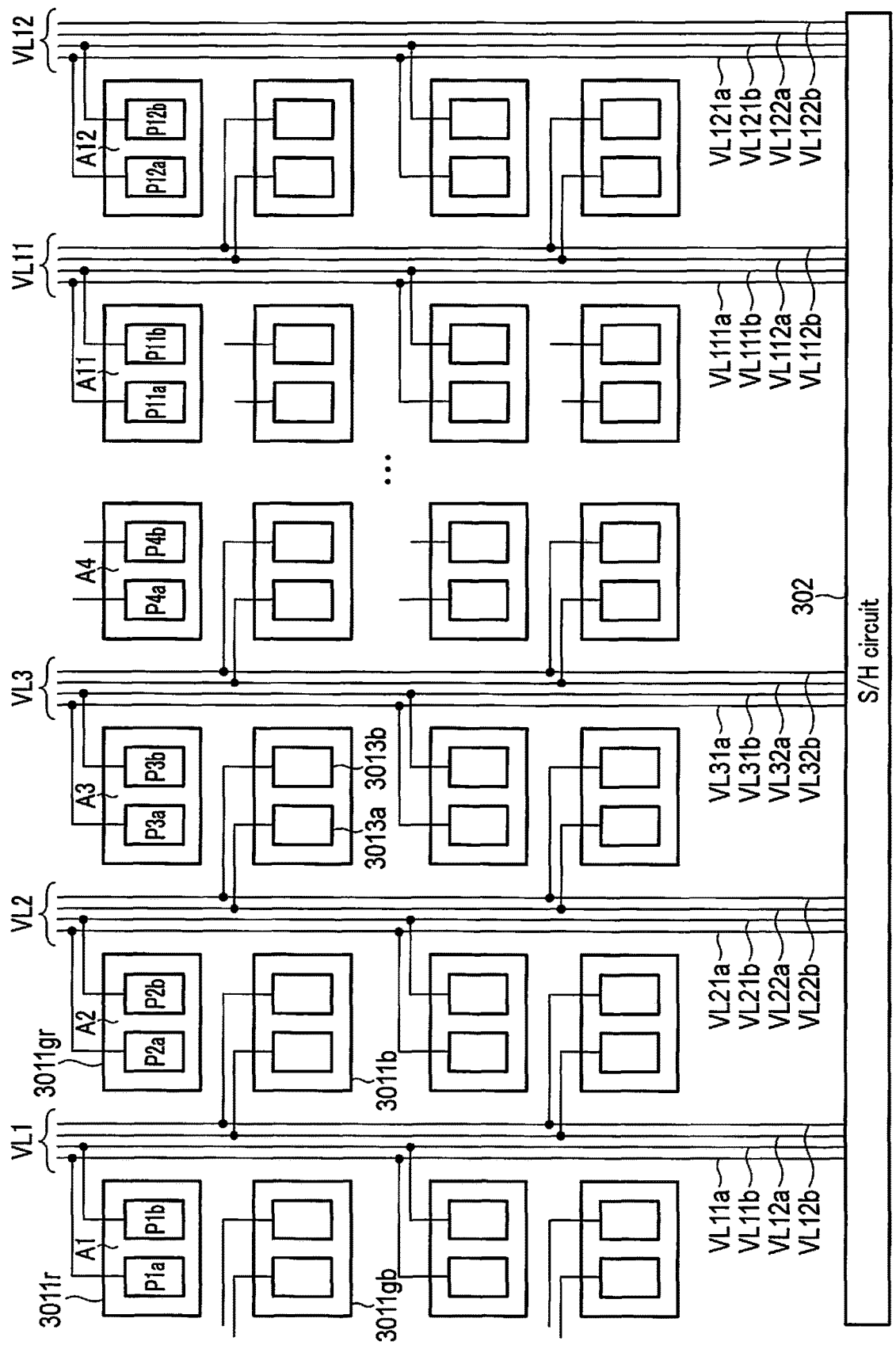
FIG. 5 is a view illustrating a second example of the connection configuration between the pixel array and S/H circuit.

FIG. 5 is a view illustrating a second example of the connection configuration between the pixel array 301 and S/H circuit 302. In the first example, the left pixels and right pixels of the orthogonally arranged pixel areas are configured to be connected to the common signal lines belonging to the same vertical signal line group. On the other hand, in the second example, the left pixels and right pixels of the orthogonally arranged pixel areas are configured to be connected to different common signal lines belonging to the same vertical signal line group. Specifically, in the second example, each vertical signal line group VLn is composed of four vertical signal lines VLn1a, VLn1b, VLn2a and VLn2b (n=1, 2, 3, . . . , 12). The vertical signal line VLn1a is connected to a left pixel Pna of a left-side pixel area of orthogonally arranged pixel areas, and the vertical signal line VLn1b is connected to a right pixel Pnb of the left-side pixel area of the orthogonally arranged pixel areas. In addition, the vertical signal line VLn2a is connected to a left pixel Pna of a right-side pixel area of the orthogonally arranged pixel areas, and the vertical signal line VLn2b is connected to a right pixel Pnb of the right-side pixel area of the orthogonally arranged pixel areas. Specifically, the vertical signal line, which is commonly used between plural pixel areas in the first example, is individually provided for each of the pixel areas in the second example.

FIG. 6 is a view illustrating an example of the connection configuration between the S/H circuit 302 and horizontal adders 303a and 303b. As illustrated in FIG. 6, the S/H circuit 302 includes the same number of S/H units as the number of pixels in one row. One half of the S/H units are S/H units SHna (n=1, 2, . . . , 12) for left pixels, and the other half are S/H units SHnb (n=1, 2, . . . , 12) for right pixels. The S/H units SHna temporarily hold, as voltage signals, the pixel signals which are output from the corresponding left pixels Pna. The S/H units SHnb temporarily hold, as voltage signals, the pixel signals which are output from the corresponding right pixels Pnb.

In addition, the respective S/H units SHna and SHnb are connected to the horizontal adder 303a via a switch circuit SC1, and to the horizontal adder 303b via a switch circuit SC2. The switch circuit SC1 includes switches Sna corresponding to the S/H units SHna and switches Snb corresponding to the S/H units SHnb, and also includes a capacitance C connected in parallel between each switch and the horizontal adder 303a. The switches Sna and Snb of the switch circuit SC1 are turned on or off at a time by an enable signal H1_EN from the reading control circuit 308. While the switches Sna and Snb are turned off by the enable signal H1_EN from the reading control circuit 308, the pixel signals, which are output from the corresponding S/H units SHna and SHnb, are retained in the capacitances C. On the other hand, when the switches Sna and Snb are turned on by the enable signal H1_EN from the reading control circuit 308, the pixel signals, which have been output from the corresponding S/H units SHna and SHnb and have been retained in the capacitances C, are output to the horizontal adder 303a. In addition, the switch circuit SC2 has the same configuration as the switch circuit SC1. It should be noted, however, that the switches Sna and Snb of the switch circuit SC2 are turned on or off at a time by an enable signal H2_EN from the reading control circuit 308.

Figure 7:
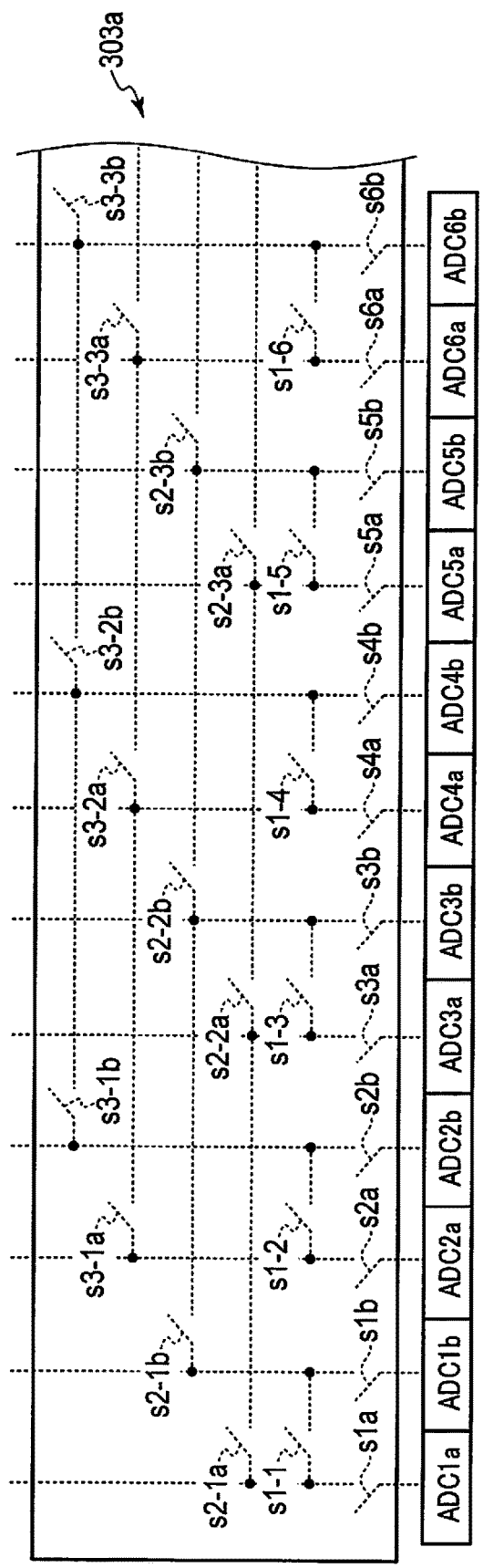
FIG. 7 is a view illustrating an internal configuration of the horizontal adder.
Figure 7:
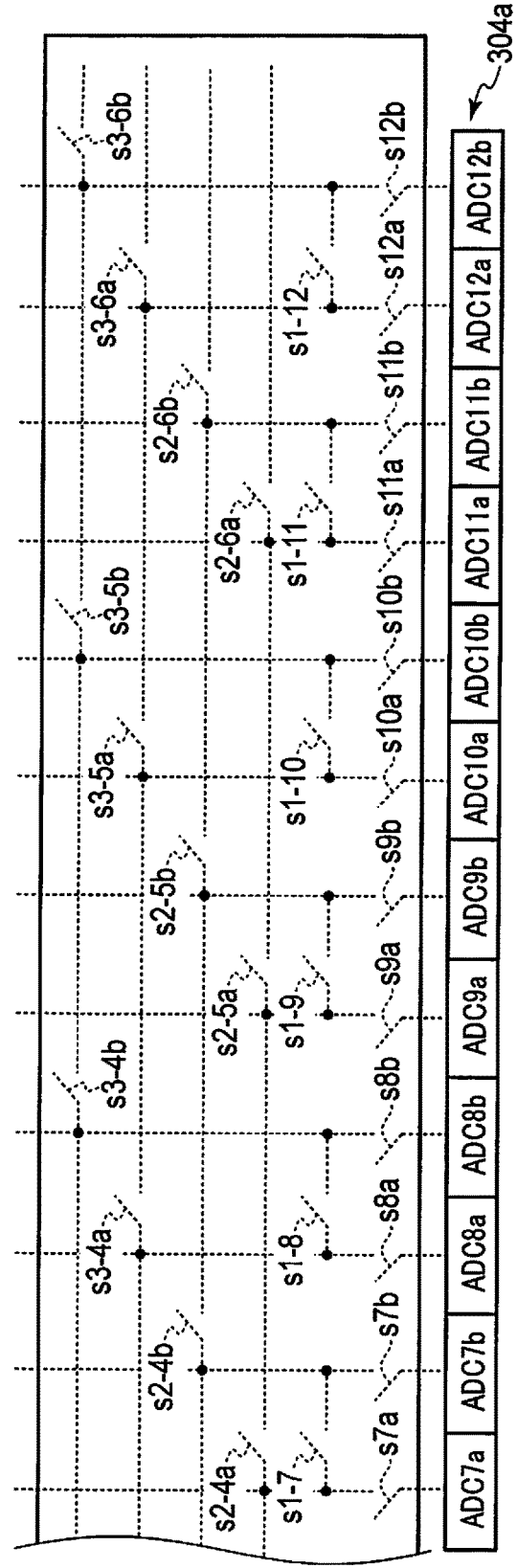

The horizontal adder 303a functioning as a first adder and the horizontal adder 303b functioning as a second adder selectively add a plurality of input pixel signals, and output added signals. FIG. 7 is a view illustrating an internal configuration of the horizontal adder. Here, the internal configuration of the horizontal adder 303a is identical to the internal configuration of the horizontal adder 303b. Thus, by describing the configuration of the horizontal adder 303a, a description of the horizontal adder 303b is omitted.

The horizontal adder 303a includes output terminals, the number of which is equal to the number of S/H units that the S/H circuit 302 includes, that is, the number of pixels of one row. The respective output terminals are connected to ADC/ gain units which constitute the ADC/gain circuit 304a. Hereinafter, for the purpose of description, ADC/gain units corresponding to the S/H units SHna are described as ADCna, and ADC/gain units corresponding to the S/H units SHnb are described as ADCnb.

The output terminals of the horizontal adder 303a are provided with output switches sna and snb (n=1, 2, . . . , 12). The ON/OFF of the output switches sna and snb is controlled by the reading control circuit 308. When one of the output switches sna and snb is turned on, a pixel signal is input to the corresponding ADC/gain unit. Here, although depiction is omitted, capacitances for retaining outputs of the horizontal adder 303a are connected to input terminals of the output switches sna and snb. While the corresponding one of the switches sna and snb is in the OFF state, the pixel signal is retained in the capacitance.

An input terminal of the horizontal adder 303a for the left pixel belonging to an identical pixel area and an input terminal of the horizontal adder 303a for the right pixel belonging to the identical pixel are connected via an addition switch, s1-1 to s1-12. For example, an input terminal for receiving a pixel signal from the S/H unit SH1a and an input terminal for receiving a pixel signal from the S/H unit SH1b are connected via the addition switch s1-1. In addition, an input terminal for receiving a pixel signal from the S/H unit SH2a and an input terminal for receiving a pixel signal from the S/H unit SH2b are connected via the addition switch s1-2. The same applies to the others. The ON/OFF of the addition switches s1-1 to s1-12 is controlled by the reading control circuit 308. When one of the addition switches s1-1 to s1-12 is turned on, a pixel signal of the left pixel belonging to the corresponding pixel area and a pixel signal of the right pixel belonging to this corresponding pixel area are added (mixed). For example, when the addition switch s1-1 is turned on, the pixel signals of the left pixel P1a and right pixel P1b of the pixel area A1 are added.

The input terminal of the horizontal adder 303a for the left pixel of an odd-numbered pixel area and the input terminal of the horizontal adder 303a for the left pixel of the next odd-numbered pixel area are connected via an addition switch, s2-1a to s2-6a. For example, the input terminal for receiving the pixel signal from the S/H unit SH1a and the input terminal for receiving the pixel signal from the S/H unit SH3a are connected via the addition switch s2-1a. In addition, the input terminal for receiving the pixel signal from the S/H unit SH3a and the input terminal for receiving the pixel signal from the S/H unit SH5a are connected via the addition switch s2-2a. The same applies to the others. The ON/OFF of the addition switches s2-1a to s2-6a is controlled by the reading control circuit 308. When one of the addition switches s2-1a to s2-6a is turned on, pixel signals of the left pixels belonging to corresponding odd-numbered pixel areas are added (mixed). For example, when the addition switch s2-1a is turned on, the pixel signal of the left pixel P1a of the pixel area A1 and the pixel signal of the left pixel P3a of the pixel area A3 are added.

The input terminal of the horizontal adder 303a for the right pixel of an odd-numbered pixel area and the input terminal of the horizontal adder 303a for the right pixel of the next odd-numbered pixel area are connected via an addition switch, s2-1b to s2-6b. For example, the input terminal for receiving the pixel signal from the S/H unit SH1b and the input terminal for receiving the pixel signal from the S/H unit SH3b are connected via the addition switch s2-1b. In addition, the input terminal for receiving the pixel signal from the S/H unit SH3b and the input terminal for receiving the pixel signal from the S/H unit SH5b are connected via the addition switch s2-2b. The same applies to the others. The ON/OFF of the addition switches s2-1b to s2-6b is controlled by the reading control circuit 308. When one of the addition switches s2-1b to s2-6b is turned on, pixel signals of the right pixels belonging to corresponding odd-numbered pixel areas are added (mixed). For example, when the addition switch s2-1b is turned on, the pixel signal of the right pixel P1b of the pixel area A1 and the pixel signal of the right pixel P3b of the pixel area A3 are added.

The input terminal of the horizontal adder 303a for the left pixel of an even-numbered pixel area and the input terminal of the horizontal adder 303a for the left pixel of the next even-numbered pixel area are connected via an addition switch, s3-1a to s3-6a. For example, the input terminal for receiving the pixel signal from the S/H unit SH2a and the input terminal for receiving the pixel signal from the S/H unit SH4a are connected via the addition switch s3-1a. In addition, the input terminal for receiving the pixel signal from the S/H unit SH4a and the input terminal for receiving the pixel signal from the S/H unit SH6a are connected via the addition switch s3-2a. The same applies to the others. The ON/OFF of the addition switches s3-1a to s3-6a is controlled by the reading control circuit 308. When one of the addition switches s3-1a to s3-6a is turned on, pixel signals of the left pixels belonging to corresponding even-numbered pixel areas are added (mixed). For example, when the addition switch s3-1a is turned on, the pixel signal of the left pixel P2a of the pixel area A2 and the pixel signal of the left pixel P4a of the pixel area A4 are added.

The input terminal of the horizontal adder 303a for the right pixel of an even-numbered pixel area and the input terminal of the horizontal adder 303a for the right pixel of the next even-numbered pixel area are connected via an addition switch, s3-1b to s3-6b. For example, the input terminal for receiving the pixel signal from the S/H unit SH2b and the input terminal for receiving the pixel signal from the S/H unit SH4b are connected via the addition switch s3-1b. In addition, the input terminal for receiving the pixel signal from the S/H unit SH4b and the input terminal for receiving the pixel signal from the S/H unit SH6b are connected via the addition switch s3-2b. The same applies to the others. The ON/OFF of the addition switches s3-1b to s3-6b is controlled by the reading control circuit 308. When one of the addition switches s3-1b to s3-6b is turned on, pixel signals of the right pixels belonging to corresponding even-numbered pixel areas are added (mixed). For example, when the addition switch s3-1b is turned on, the pixel signal of the right pixel P2b of the pixel area A2 and the pixel signal of the right pixel P4b of the pixel area A4 are added.

The ADC/gain circuit 304a functioning as a first A/D converter circuit includes ADC/gain units ADCna (n=1, 2, 3, . . . , 12) which are connected to the output terminals of the horizontal adder 303a. In accordance with analog gains for display (first analog gains) which are set in the reading control circuit 308 by the CPU 6, the ADC/gain circuit 304a converts the pixel signals to digital signals while amplifying the pixel signals. The ADC/gain circuit 304b functioning as a second A/D converter circuit includes ADC/gain units ADCnb (n=1, 2, 3, . . . , 12) which are connected to the output terminals of the horizontal adder 303b. In accordance with analog gains for focus detection (second analog gains) which are set in the reading control circuit 308 by the CPU 6, the ADC/gain circuit 304b converts the pixel signals to digital signals while amplifying the pixel signals. The VREF 305a is a power supply which is used for A/D conversion in the ADC/gain circuit 304a. The VREF 305b is a power supply which is used for A/D conversion in the ADC/gain circuit 304b. The dynamic ranges of the ADC/gain circuit 304a and ADC/gain circuit 304b are determined in accordance with magnitudes, etc. of the voltages generated by the VREF 305a and VREF 305b.

The digital memory 306a temporarily stores digital pixel signals generated by the ADC/gain circuit 304a, in accordance with a control signal from the reading control circuit 308. The digital memory 306b temporarily stores digital pixel signals generated by the ADC/gain circuit 304b, in accordance with a control signal from the reading control circuit 308.

The output circuit 307a reads out the digital pixel signals stored in the digital memory 306a and outputs the digital pixel signals to the outside of the imaging element 3, in accordance with a control signal from the reading control circuit 308. The output circuit 307b reads out the digital pixel signals stored in the digital memory 306b and outputs the digital pixel signals to the outside of the imaging element 3, in accordance with a control signal from the reading control circuit 308.

The reading control circuit 308 generates control signals for controlling the respective components of the above-described imaging element 3. By the control signals generated by the reading control circuit 308, the storage of electric charges in the pixel array 301 is executed, the setting of the pixel additions in the horizontal adders 303a and 303b is executed, and the setting of the analog gains in the ADC/gain circuits 304a and 304b is executed.

Figure 8:
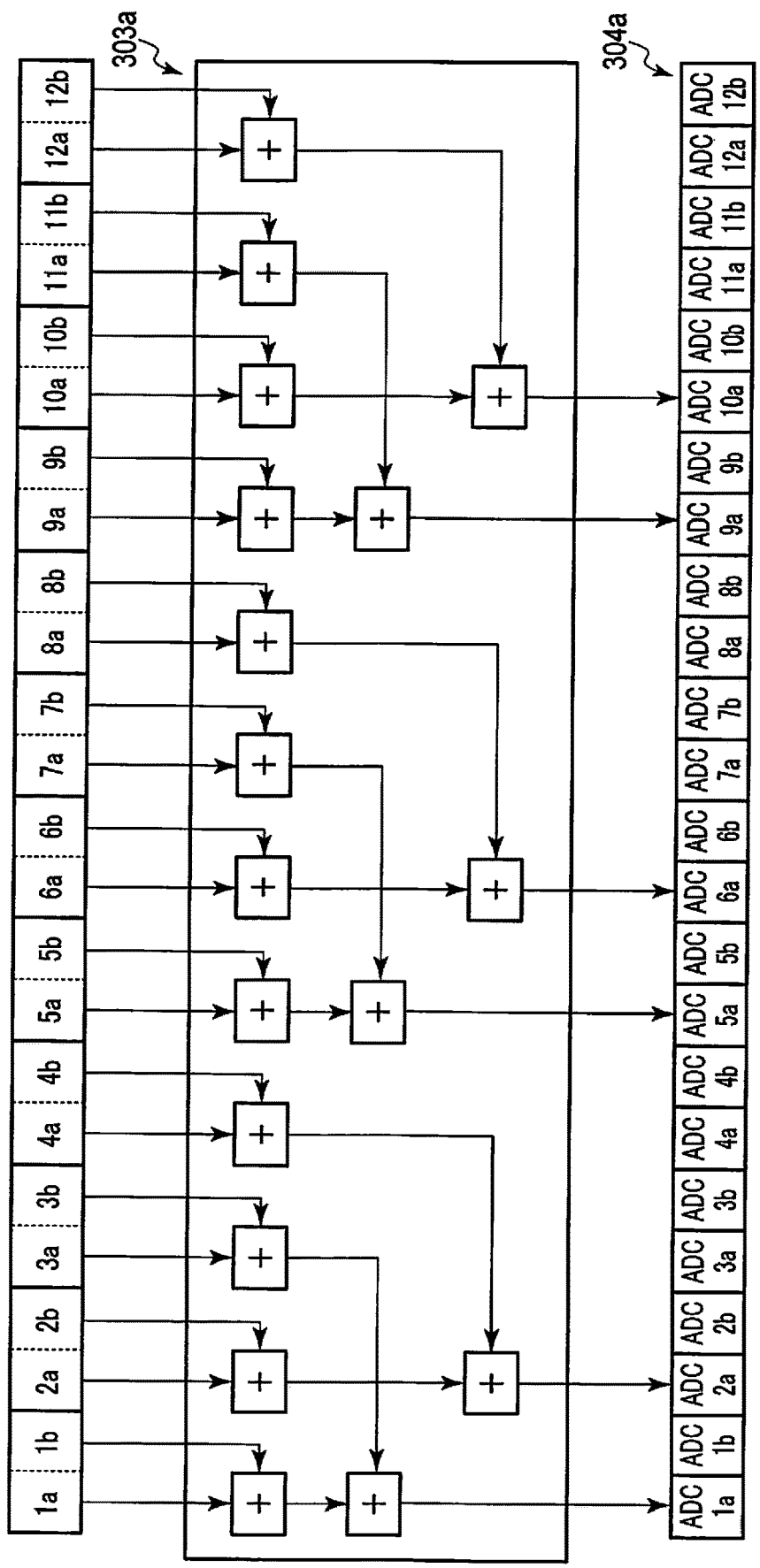
FIG. 8 is a view illustrating a setting of a horizontal adder 303a at a time when live view display and focus detection are executed in parallel.
Figure 9:
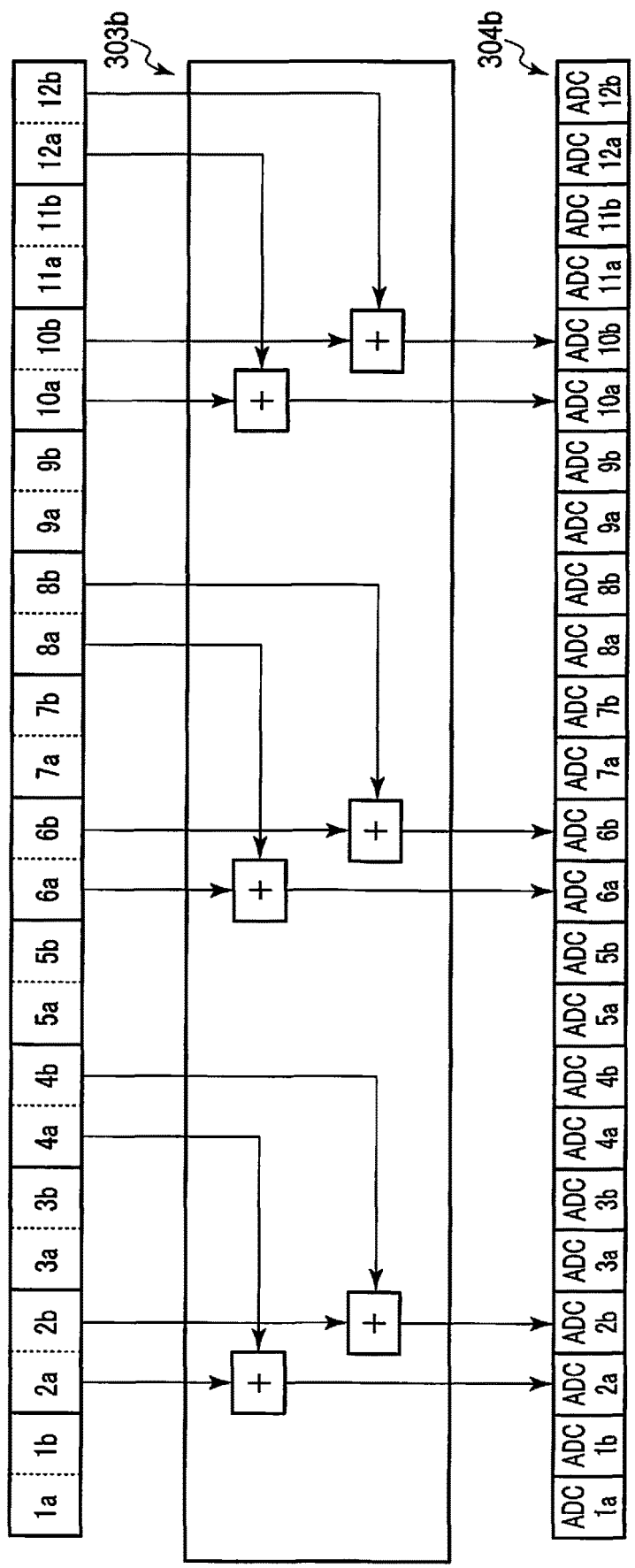
FIG. 9 is a view illustrating a setting of a horizontal adder 303b at a time when live view display and focus detection are executed in parallel.

Next, the operation of the imaging apparatus according to the present embodiment will be described. The focus detection in this embodiment can be executed even while the live view display is being executed. FIG. 8 is a view illustrating a setting of the horizontal adder 303a at a time when live view display and focus detection are executed in parallel. FIG. 9 is a view illustrating a setting of the horizontal adder 303b at a time when live view display and focus detection are executed in parallel. When the live view display and the focus detection are executed in parallel, one of the horizontal adder 303a and horizontal adder 303b is utilized as a circuit which generates pixel signals for display, and the other is utilized as a circuit which generates pixel signals for focus detection. Hereinafter, a description is given of an example in which the horizontal adder 303a is utilized as the circuit which generates pixel signals for display, and the horizontal adder 303b is utilized as a circuit which generates pixel signals for focus detection.

A pixel signal for display is obtained by adding pixel signals of the left pixel and right pixel in the same pixel area. Accordingly, the reading control circuit 308 turns on the addition switches s1-1, s1-2, s1-3, s1-4, s1-5, s1-6, s1-7, s1-8, s1-9, s1-10, s1-11, and s1-12. By these addition switches being turned on, as illustrated in FIG. 8, addition signals of the pixel signals of the left pixels and right pixels of the respective pixel areas are output from the horizontal adder 303a.

Here, when live view display is executed, neighboring same-color pixel signals are added and read, for example, in order to suppress a decrease of a frame rate. In the present embodiment, too, such added reading can be performed. When added reading is performed, the reading control circuit 308 turns on, for example, the addition switches s2-1a, s2-3a and s2-5a, turns off the addition switches s2-2a, s2-4a and s2-6a, turns on the addition switches s3-1a, s3-3a and s3-5a, and turns off the addition switches s3-2a, s3-4a and s3-6a. Thereby, the horizontal adder 303a enters a first state, the pixel signals of two odd-numbered pixel areas, which neighbor in the horizontal direction, are added, and the pixel signals of two even-numbered pixel areas, which neighbor in the horizontal direction, are added. In short, two same-color pixel signals which neighbor in the horizontal direction are added.

For example, the addition switches s1-1, s1-3 and s2-1a are turned on, and the addition switch s2-2a is turned off. Thereby, the pixel signals of the pixels P1a, P1b, P3a and P3b are added (mixed) in the signal line for the pixel P1a. Similarly, the addition switches s1-5, s1-7 and s2-3a are turned on, and the addition switches s2-4a, s2-1b and s2-2b are turned off. Thereby, the pixel signals of the pixels P5a, P5b, P7a and P7b are added in the signal line for the pixel P5a. The addition switches s1-9, s1-11 and s2-5a are turned on, and the addition switches s2-6a, s2-3b and s2-4b are turned off. Thereby, the pixel signals of the pixels P9a, P9b, P11a and P11b are added in the signal line for the pixel P9a.

In addition, the addition switches s1-2, s1-4 and s3-1a are turned on, and the addition switches s3-2a, s3-1b and s3-2b are turned off. Thereby, the pixel signals of the pixels P2a, P2b, P4a and P4b are added in the signal line for the pixel P2a. Similarly, the addition switches s1-6, s1-8 and s3-3a are turned on, and the addition switches s3-4a, s3-3b and s3-4b are turned off. Thereby, the pixel signals of the pixels P6a, P6b, P8a and P8b are added in the signal line for the pixel P6a. The addition switches s1-10, s1-12 and s3-5a are turned on, and the addition switches s3-6a, s3-5b and s3-6b are turned off. Thereby, the pixel signals of the pixels P10a, P10b, P12a and P12b are added in the signal line for the pixel P10a.

By this addition, six addition signals are generated. Each of these addition signals is a signal which is obtained by adding pixel signals from same-color pixel areas which neighbor in the horizontal direction. In order to output these addition signals to the corresponding ADC/gain units, the reading control circuit 308 turns on the output switches s1a, s2a, s5a, s6a, s9a and s10a. By these switches being turned on, the addition signals are output to the corresponding ADC/gain units.

The pixel signals for focus detection are obtained by individually outputting pixel signals of pixels provided in each pixel area. Accordingly, the reading control circuit 308 turns off the addition switches s1-1, s1-2, s1-3, s1-4, s1-5, s1-6, s1-7, s1-8, s1-9, s1-10, s1-11 and s1-12. By these addition switches being turned off, as illustrated in FIG. 9, the pixel signals of the left pixel and right pixel of each pixel area are individually output from the horizontal adder 303b.

As regards the pixel signals for focus detection, too, the same added reading as with the pixel signals for display can be executed. When added reading is executed, the reading control circuit 308 turns on, for example, the addition switches s3-1a, s3-1b, s3-3a, s3-3b, s3-5a and s3-5b, and turns off the addition switches s3-2a, s3-2b, s3-4a, s3-4b, s3-6a and s3-6b, and addition switches s1-2, s1-4, s1-6, s1-8, s1-10 and s1-12. Thereby, the horizontal adder 303b enters a second state, and the pixel signals of the same position in the pixel areas, which neighbor in the horizontal direction, are added.

For example, the addition switches s3-1a and s3-1b are turned on, and the addition switches s3-2a and s3-2b, s1-2 and s1-4 are turned off. Thereby, the pixel P2a and pixel P4a are added (mixed) in the signal line for the pixel P2a, and the pixel P2b and pixel P4b are added in the signal line for the pixel P2b. Similarly, the addition switches s3-3a and s3-3b are turned on, and the addition switches s3-4a and s3-4b, s1-6 and s1-8 are turned off. Thereby, the pixel P6a and pixel P8a are added (mixed) in the signal line for the pixel P6a, and the pixel P6b and pixel P8b are added in the signal line for the pixel P6b. The addition switches s3-5a and s3-5b are turned on, and the addition switches s3-6a and s3-6b, s1-10 and s1-12 are turned off. Thereby, the pixel P10a and pixel P12a are added (mixed) in the signal line for the pixel P10a, and the pixel P10b and pixel P12b are added in the signal line for the pixel P10b.

By this addition, six addition signals (three addition signals of left pixels and three addition signals of right pixels) are generated. These addition signals are signals which are obtained by adding pixel signals of left pixels of same-color pixel areas which neighbor in the horizontal direction, and pixel signals of right pixels of same-color pixel areas which neighbor in the horizontal direction. In the example of FIG. 9, a pair of a pixel signal of a right pixel and a pixel signal of a left pixel is formed by an addition signal of the pixel P2a and pixel P4a and an addition signal of the pixel P2b and pixel P4b. Similarly, a pair of a pixel signal of a right pixel and a pixel signal of a left pixel is formed by an addition signal of the pixel P6a and pixel P8a and an addition signal of the pixel P6b and pixel P8b. A pair of a pixel signal of a right pixel and a pixel signal of a left pixel is formed by an addition signal of the pixel P10a and pixel P12a and an addition signal of the pixel P10b and pixel P12b. In order to output these addition signals to the corresponding ADC/gain units, the reading control circuit 308 turns on the output switches s2a, s2b, s6a, s6b, s10a and s10b. By these switches being turned on, the addition signals are output to the corresponding ADC/gain units.

The above-described serial reading of pixel signals is repeated for each of the rows of the pixel array 301. Thereby, the pixel signals for live view display and the pixel signals for focus detection can be read at the same time.

After the above reading of the pixel signals, the ADC/gain units of the ADC/gain circuit 304a and ADC/gain circuit 304b convert the input pixel signals to digital signals while amplifying the input pixel signals with set analog gains. Here, power supply may be turned off to the ADC/gain units to which pixel signals are not input (in the example of FIG. 8, the ADC/gain units excluding the ADC/gain units ADC1a, ADC2a, ADC5a, ADC6a, ADC9a and ADC10a; in the example of FIG. 9, the ADC/gain units excluding the ADC/gain units ADC2a, ADC2b, ADC6a, ADC6b, ADC10a and ADC10b). Power saving can be achieved by turning off the power supply to unnecessary ADC/gain units.

FIG. 10 is a graph showing a relationship between a setting of an analog gain for a pixel signal for focus detection, and an output of the ADC/gain circuit 304b. The abscissa axis in FIG. 10 indicates a charge accumulation time in the pixel. FIG. 10 indicates an output of the ADC/gain unit.

In general, a photodiode (PD) which constitutes a pixel generates an electric charge which is substantially proportional to a light incidence time. Specifically, the magnitude of the pixel signal is proportional to the accumulation time of an electric charge. Here, the pixel signal for display is an addition signal of the pixel signals of the left pixel and right pixel, whereas the pixel signal for focus detection is the pixel signal of either the left pixel or the right pixel. Thus, even when the accumulation time of the electric charge is the same, the magnitude of the pixel signal for focus detection is about half the magnitude of the pixel signal for display. Accordingly, for the purpose of focus detection calculation with high precision, it is preferable that the pixel signal for focus detection is amplified with a proper analog gain.

However, for example, when a high-luminance subject exists under a low-luminance light source, if a high gain such as 12 dB is set, it is possible that even the pixel signal for focus detection exceeds a range (AD full range) in which A/D conversion of the ADC is enabled, and is saturated. As shown in FIG. 10, a pixel signal component exceeding the AD full range is discarded. The pixel signal component which is discarded becomes greater as the gain becomes larger.

In the present embodiment, the pixel signal for live view display is input to the ADC/gain circuit 304a, and the pixel signal for focus detection is input to the ADC/gain circuit 304b. Accordingly, by individually setting analog gains for the ADC/gain circuit 304a and ADC/gain circuit 304b, it is possible to execute optimal exposure settings for the pixel signal for live view display and the pixel signal for focus detection, respectively. For example, in the case of FIG. 10, amplification is not executed for the pixel signal for focus detection, or the analog gain is set to be small for the pixel signal for focus detection. Thereby, the saturation amount of the pixel signal can be reduced, and the pixel signal can be utilized to the maximum.

As has been described above, according to the present embodiment, by individually providing the adders for adding pixel signals for the live view display and for the focus detection, it becomes possible to simultaneously execute the reading of the pixel signals for live view display and the reading of the pixel signals for focus detection. Thereby, a decrease of the frame rate and an increase of the data rate can be suppressed in the case of executing focus detection.

Moreover, in the present embodiment, the ADC/gain circuit adaptive to the live view display and the ADC/gain circuit adaptive to the focus detection are individually provided. Thereby, optimal exposure settings can be executed for the pixel signals for live view display and for the pixel signals for focus detection.

Besides, in the example illustrated in FIG. 8 and FIG. 9, in the ADC/gain circuit 304a for live view display, six ADC/gain units operate. In the ADC/gain circuit 304b, too, six ADC/gain units operate. Thereby, the pixel signal take-in process in the rear stage of the imaging element 3 can be made common. The circuit scale can be reduced by a degree corresponding to the common sharing of the pixel signal take-in process circuit.

Here, in the above-described example, it is assumed that the horizontal adder for live view display is the horizontal adder 303a, and the horizontal adder for focus detection is the horizontal adder 303b. However, the horizontal adder 303a and horizontal adder 303b have the common configuration. The setting for using the horizontal adder 303a as the horizontal adder for live view display and using the horizontal adder 303b as the horizontal adder for focus detection is executed by only changing over the settings of the addition switches and output switches. Accordingly, depending on the method of changing over the settings of the addition switches and output switches, the horizontal adder 303b can be used as the horizontal adder for live view display, and the horizontal adder 303a can be used as the horizontal adder for focus detection.

[Modification 1]

Hereinafter, modifications of the present embodiment will be described. In the above-described horizontal adders 303a and 303b, various addition processes can be executed by changing over the settings of the internal switches. For example, FIG. 11 is a view illustrating a setting of a horizontal adder 303b of Modification 1.

Figure 11:
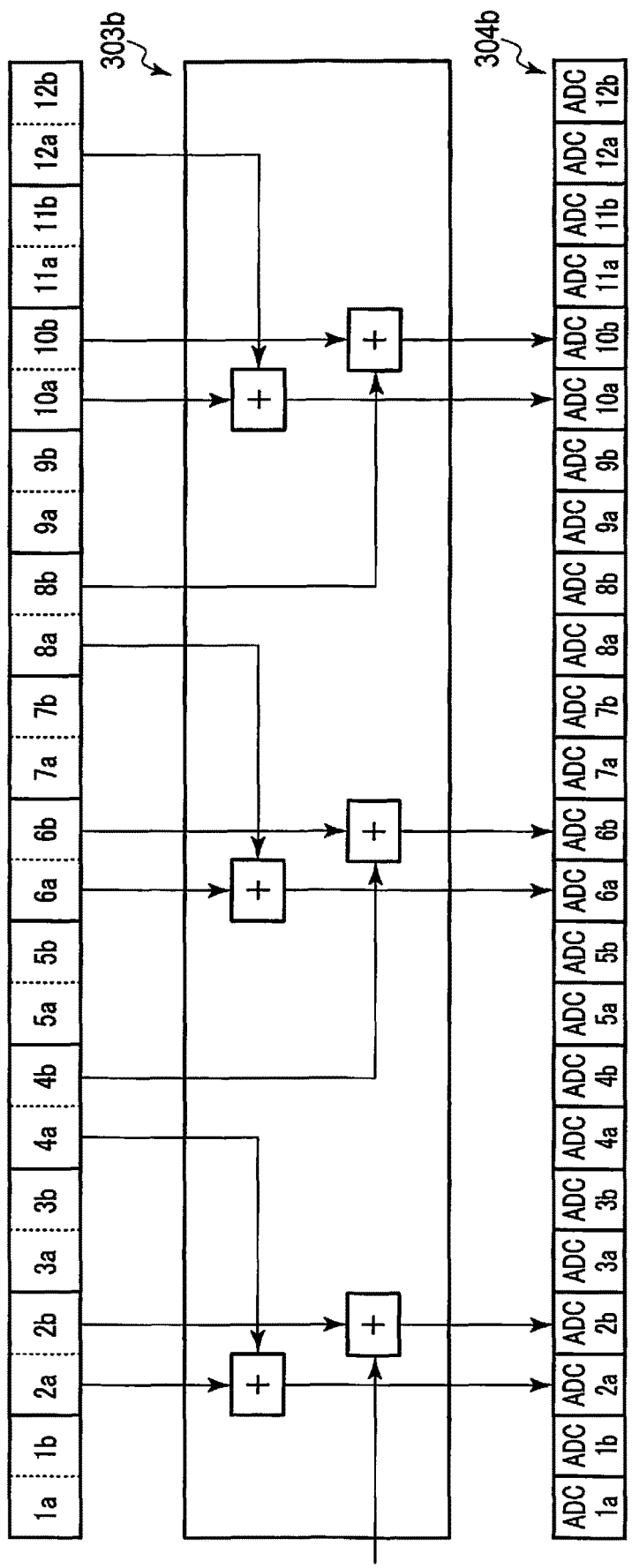
FIG. 11 is a view illustrating a setting of a horizontal adder 303b of Modification 1.

The addition as illustrated in FIG. 11 is performed, for example, by turning on the addition switches s3-1a, s3-3a and s3-5a, and addition switches s3-0b (although not shown in FIG. 7, the addition switch s3-0b is a switch which connects an input terminal for a right pixel of a 0th pixel area neighboring on the left side of the first pixel area and an input terminal for a right pixel of a second pixel area), s3-2b and s3-4b, and by turning off the addition switches excluding these addition switches. In addition, as regards the output switches, it should suffice if only the output switches s2a, s2b, s6a, s6b, s10a and s10b are turned on.

In the addition as illustrated in FIG. 11, like the case of FIG. 9, six addition signals (three addition signals of left pixels and three addition signals of right pixels) are generated. These addition signals are signals which are obtained by adding pixel signals of left pixels which neighbor in the horizontal direction, and pixel signals of right pixels which neighbor in the horizontal direction. In the example of FIG. 11, the pixels, which are used for pixel addition, are different from those in the example of FIG. 9. However, the ADC/gain units, which are operated, can be the same as those in the example of FIG. 9. Specifically, in the present embodiment, optimal additions of pixel signals for focus detection can properly be performed.

In the example of FIG. 11, unlike the case of FIG. 9, a pair of a pixel signal of a right pixel and a pixel signal of a left pixel is formed by an addition signal of the pixel P2a and pixel P4a and an addition signal of the pixel P4b and pixel P6b. Similarly, a pair of a pixel signal of a right pixel and a pixel signal of a left pixel is formed by an addition signal of the pixel P6a and pixel P8a and an addition signal of the pixel P8b and pixel P10b. Specifically, in the addition as illustrated in FIG. 11, since a spatial overlap area between the left pixel and right pixel decreases, a parallax between the left pixel and right pixel can be optimized.

[Modification 2]

The above-described embodiment and Modification 1 are examples of additions of pixel signals using adders. However, the adder of the embodiment can also execute thinning-out of pixels.

Figure 12:
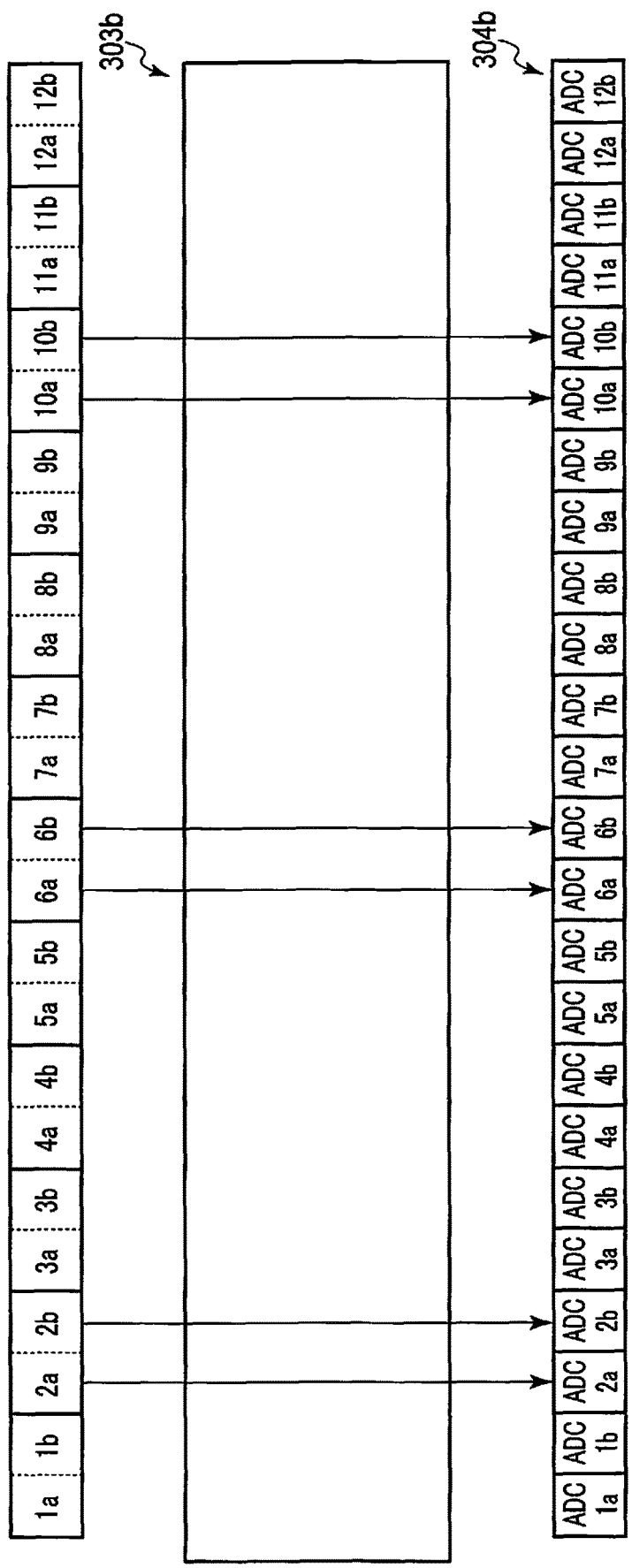
FIG. 12 is a view illustrating a setting of a horizontal adder 303b of Modification 2.

FIG. 12 is a view illustrating a setting of a horizontal adder 303b of Modification 2. Here, FIG. 12 illustrates an example of horizontal ½ thinning-out in the horizontal adder 303b. The thinning-out as illustrated in FIG. 12 is executed, for example, by turning off all addition switches, and turning on the output switches s2a, s2b, s6a, s6b, s10a and s10b. By this setting, the number of pixel signals which are output is reduced to ½ by thinning-out.

In FIG. 12, by the setting of the addition switches, such a modification can be made that the pixel signal from the pixel P2a is not output via the output switch s2a, but the pixel signal from the pixel P4a is output via the output switch s2a.

[Modification 3]

The above-described embodiment and Modification 1 are examples of addition of two pixels of the same color, which neighbor in the horizontal direction. However, the adder of the present embodiment can also add pixels other than the two pixels of the same color, which neighbor in the horizontal direction.

Figure 13:
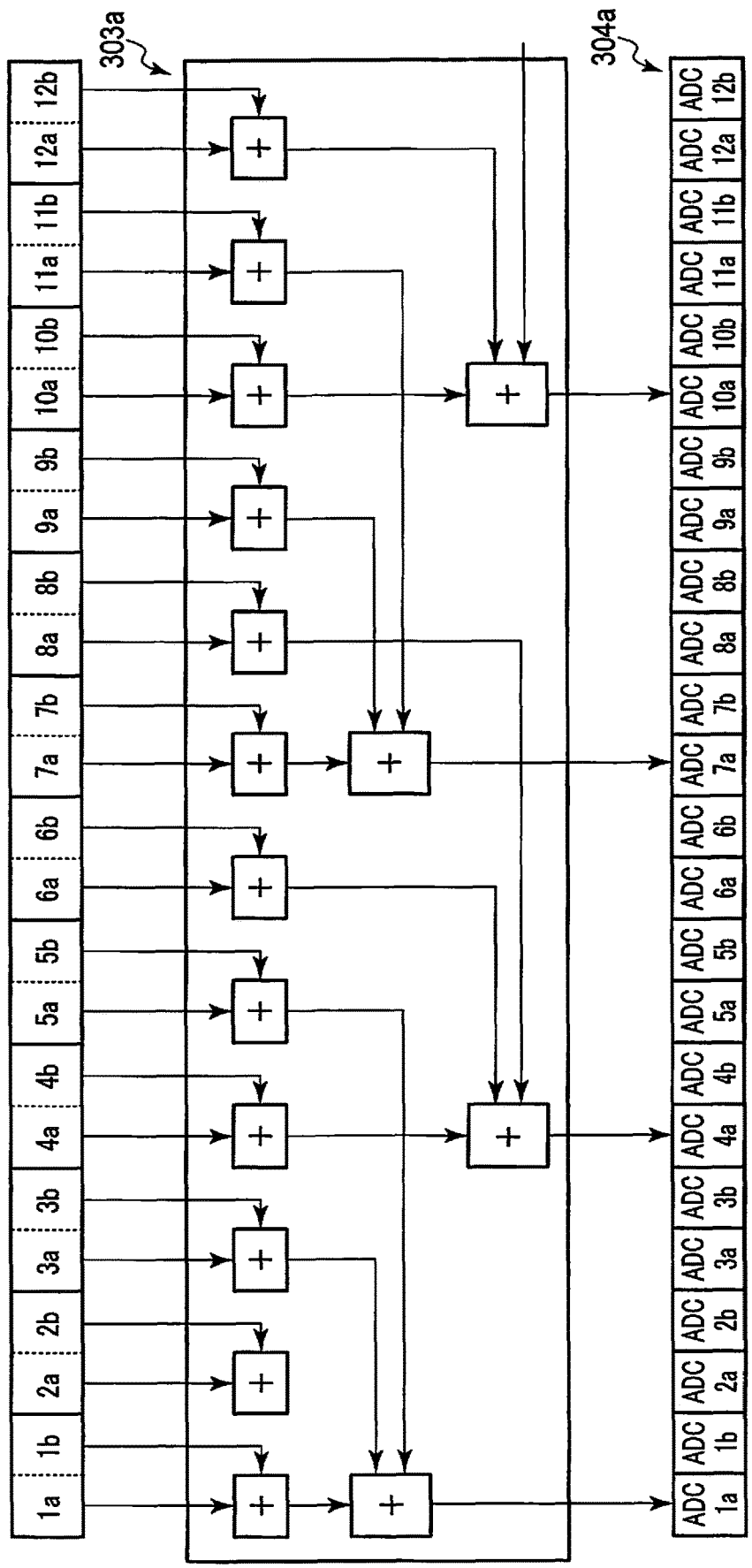
FIG. 13 is a view illustrating a setting of a horizontal adder 303a of Modification 3.

FIG. 13 is a view illustrating a setting of a horizontal adder 303a of Modification 3. Here, FIG. 13 illustrates an example of horizontal three-pixel addition in the horizontal adder 303a. The addition as illustrated in FIG. 13 is executed, for example, by turning on the addition switches s1-1, s1-2, s1-3, s1-4, s1-5, s1-6, s1-7, s1-8, s1-9, s1-10, s1-11 and s1-12, and the addition switches s2-1a, s2-2a, s2-4a, s2-5a, s3-2a, s3-3a, s3-5a and s3-6a, and turning off the addition switches other than these addition switches. In addition, as regards the output switches, it should suffice if only the output switches s1a, s4a, s7a and s10a are turned on.

Figure 14:
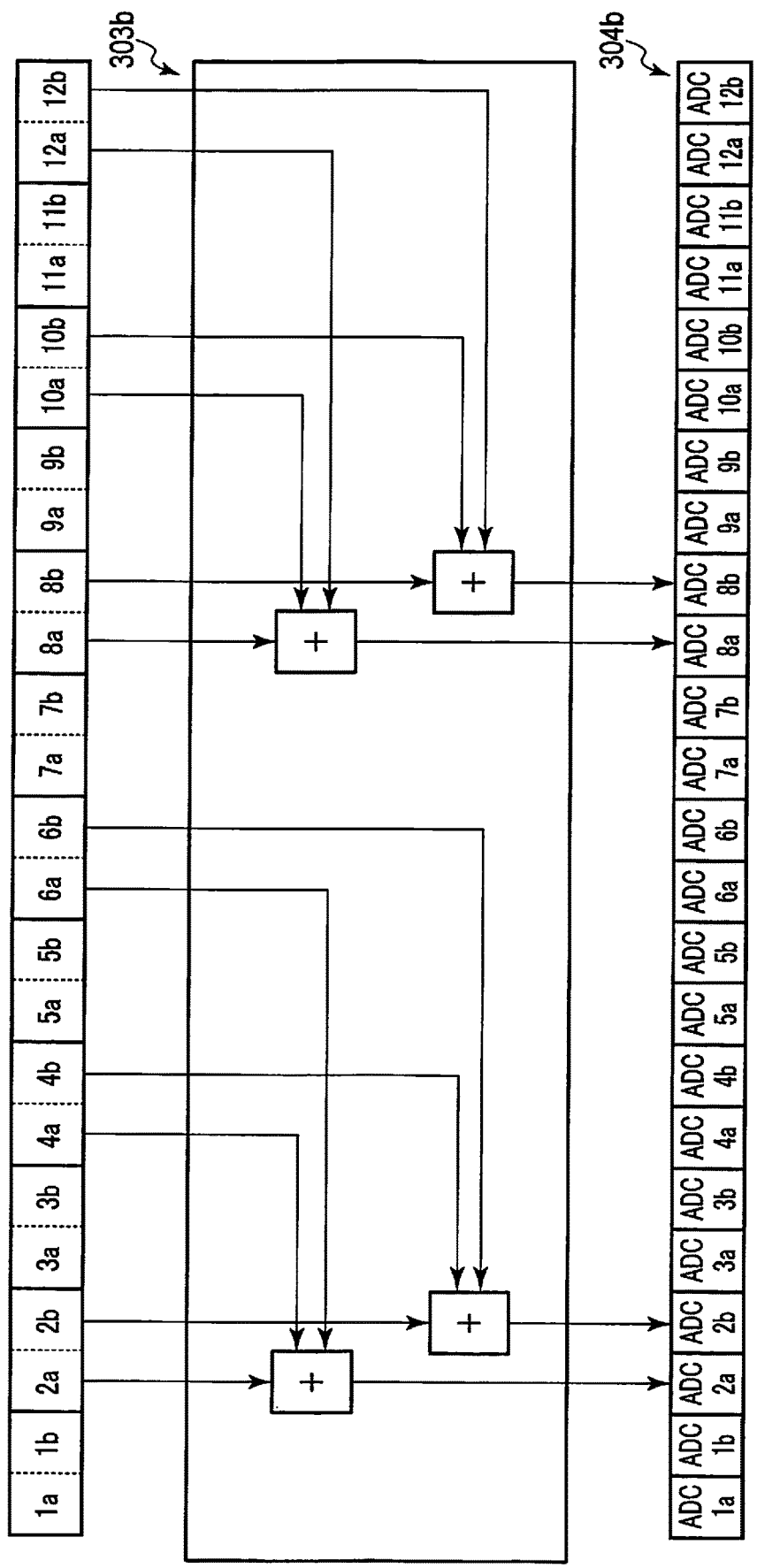
FIG. 14 is a view illustrating a setting of a horizontal adder 303b of Modification 3.

FIG. 14 is a view illustrating a setting of a horizontal adder 303b of Modification 3. Here, FIG. 14 illustrates an example of horizontal three-pixel addition in the horizontal adder 303b. The addition as illustrated in FIG. 14 is executed, for example, by turning on the addition switches s3-1a, s3-2a, s3-4a, s3-5a, s3-1b, s3-2b, s3-4b and s3-5b, and turning off the addition switches other than these addition switches. Besides, as regards the output switches, it should suffice if only the output switches s2a, s2b, s8a and s8b are turned on.

Figure 15:
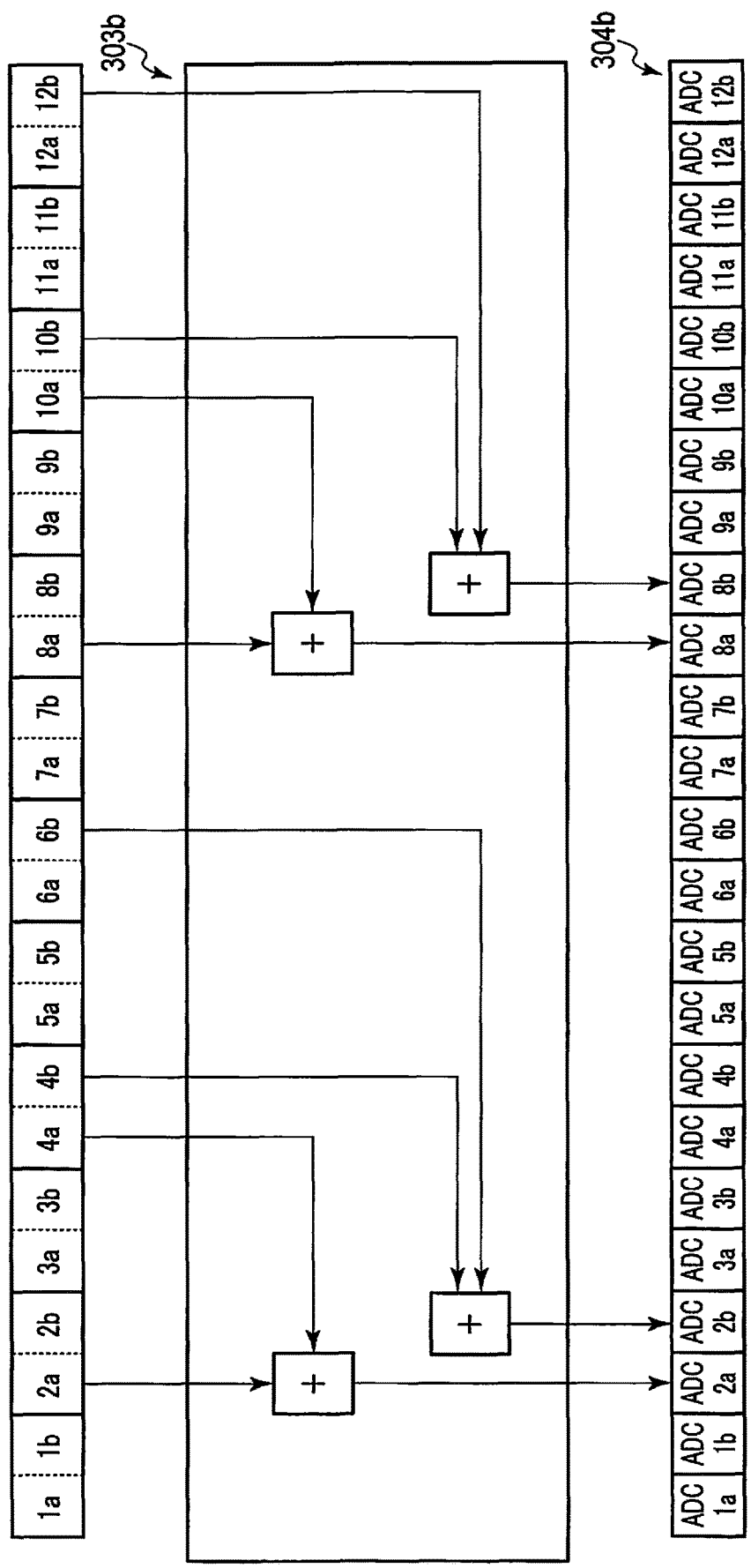
FIG. 15 is a view illustrating another setting of the horizontal adder 303b of Modification 3.

FIG. 15 is a view illustrating another setting of the horizontal adder 303b of Modification 3. Here, FIG. 15 illustrates an example of horizontal ⅔ pixel addition in the horizontal adder 303b. The addition as illustrated in FIG. 15 is executed, for example, by turning on the addition switches s3-1a, s3-4a, s3-2b and s3-5b, and turning off the addition switches other than these addition switches. Besides, as regards the output switches, it should suffice if only the output switches s2a, s2b, s8a and s8b are turned on.

In the addition as illustrated in FIG. 15, like the example of FIG. 11, since there is no spatial overlap between the left pixel and right pixel, a parallax between the left pixel and right pixel can be optimized.

[Modification 4]

Figure 16:
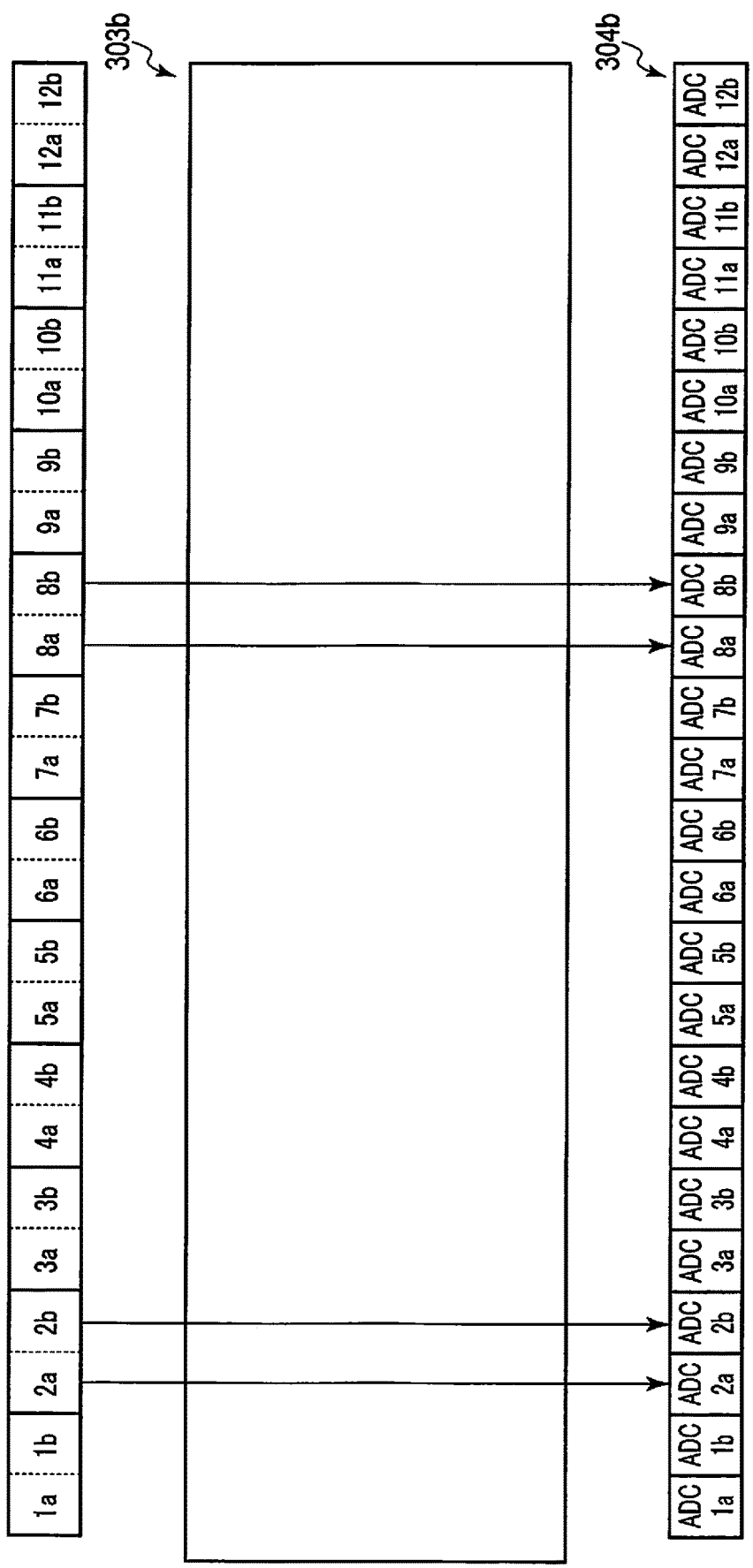
FIG. 16 is a view illustrating a setting of a horizontal adder 303b of Modification 4.

As a further modification of the above-described Modification 2, pixel thinning-out other than ½ can be executed. FIG. 16 is a view illustrating a setting of a horizontal adder 303b of Modification 4. Here, FIG. 16 illustrates an example of ⅓ pixel thinning-out. The thinning-out as illustrated in FIG. 16 is executed, for example, by turning off all addition switches, and turning on the output switches s2a, s2b, s8a and s8b. Like the case of Modification 2, by the setting of the addition switches, such a modification can be made that the pixel signal from the pixel P2a is not output via the output switch s2a, but the pixel signal from the pixel P4a is output via the output switch s2a.

[Modification 5]

In the above-described embodiment and the modifications thereof, two pixels are disposed in one pixel area. However, the number of pixels disposed in the pixel area is not limited to two. For example, as illustrated in FIG. 17, the technique of the present embodiment is also applicable to a configuration of the pixel array 301 in which an upper left pixel 3013a, an upper right pixel 3013b, a lower left pixel 3013c and a lower right pixel 3013d are disposed in one pixel area.

FIG. 18 is a view illustrating a first example of a connection configuration between the pixel array 301 and vertical signal line groups at a time when four pixels are disposed in one pixel area. Here, FIG. 18 illustrates only the connection configuration between two neighboring pixel areas and vertical signal line groups. However, needless to say, the number of pixel areas is not limited to two. In FIG. 18, the upper left pixel is described as nLT, the upper right pixel is described as nRT, the lower left pixel is described as nLB, and the lower right pixel is described as nRB (n=1, 2).

In the first example, a pair of the upper left pixel and lower left pixel in the same pixel area is regarded as the left pixel described in the above embodiment, and a pair of the upper right pixel and lower right pixel in the same pixel area is regarded as the right pixel described in the above embodiment. The respective paired pixels are connected to common vertical signal lines of the corresponding vertical signal line group. For example, in a pixel area A1, an upper left pixel 1LT and a lower left pixel 1LB are connected, as a left pixel P1*a*, to a vertical signal line VL1*a* of a vertical signal line group VL1, and an upper right pixel 1RT and a lower right pixel 1RB are connected, as a right pixel P1*b*, to a vertical signal line VL1*b* of the vertical signal line group VL1. Similarly, in a pixel area A2, an upper left pixel 2LT and a lower left pixel 2LB are connected, as a left pixel P2*a*, to a vertical signal line VL2*a* of a vertical signal line group VL2, and an upper right pixel 2RT and a lower right pixel 2RB are connected, as a right pixel P2*b*, to a vertical signal line VL2*b* of the vertical signal line group VL2.

In the connection configuration as illustrated in FIG. 18, an addition signal of the upper left pixel and lower left pixel and an addition signal of the upper right pixel and lower right pixel are output from the pixel array 301. Accordingly, exactly the same components as in the above-described embodiment and modifications can be used for the S/H circuit 302, horizontal adders 303*a* and 303*b*, ADC/gain circuits 304*a* and 304*b*, VREFs 305*a* and 305*b*, digital memories 306*a* and 306*b*, output circuits 307*a* and 307*b* and reading control circuit 308, which are provided in the rear stage of the pixel array 301.

Figure 19:
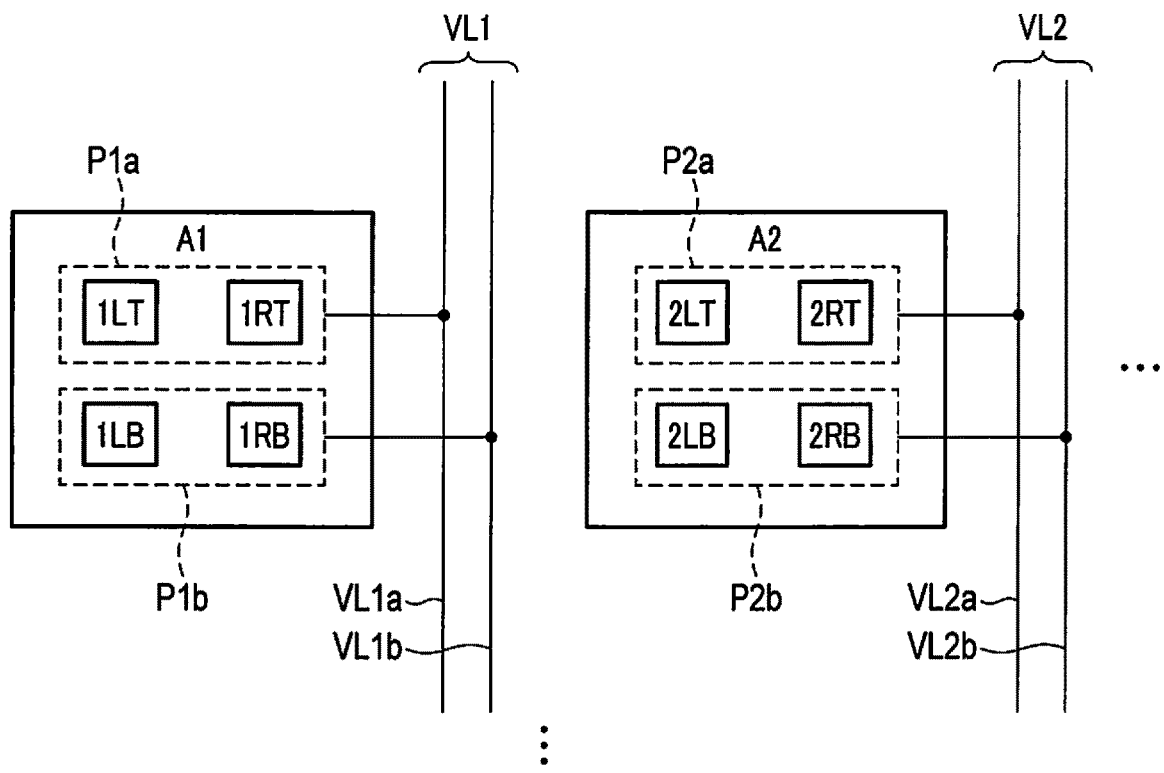
FIG. 19 is a view illustrating a second example of the connection configuration between the pixel array and vertical signal line groups at a time when four pixels are disposed in one pixel area.

FIG. 19 is a view illustrating a second example of the connection configuration between the pixel array 301 and vertical signal line groups at a time when four pixels are disposed in one pixel area.

In the second example, a pair of the upper left pixel and upper right pixel in the same pixel area is regarded as the upper pixel described in the above embodiment, and a pair of the lower left pixel and lower right pixel in the same pixel area is regarded as the lower pixel described in the above embodiment. The respective paired pixels are connected to common vertical signal lines of the corresponding vertical signal line group. For example, in a pixel area A1, an upper left pixel 1LT and an upper right pixel 1RT are connected, as an upper pixel P1*a*, to a vertical signal line VL1*a* of a vertical signal line group VL1, and a lower left pixel 1LB and a lower right pixel 1RB are connected, as a lower pixel P1*b*, to a vertical signal line VL1*b* of the vertical signal line group VL1. Similarly, in a pixel area A2, an upper left pixel 2LT and an upper right pixel 2RT are connected, as an upper pixel P2*a*, to a vertical signal line VL2*a* of a vertical signal line group VL2, and a lower left pixel 2LB and a lower right pixel 2RB are connected, as a lower pixel P2*b*, to a vertical signal line VL2*b* of the vertical signal line group VL2.

In the connection configuration as illustrated in FIG. 19, an addition signal of the upper left pixel and upper right pixel and an addition signal of the lower left pixel and lower right pixel are output from the pixel array 301. Accordingly, exactly the same components as in the above-described embodiment and modifications can be used for the S/H circuit 302, horizontal adders 303*a* and 303*b*, ADC/gain circuits 304*a* and 304*b*, VREFs 305*a* and 305*b*, digital memories 306*a* and 306*b*, output circuits 307*a* and 307*b* and reading control circuit 308, which are provided in the rear stage of the pixel array 301. Moreover, in the connection configuration as illustrated in FIG. 19, a phase difference in the vertical direction in the screen can be detected in the focus detection unit 7.

Figure 20:
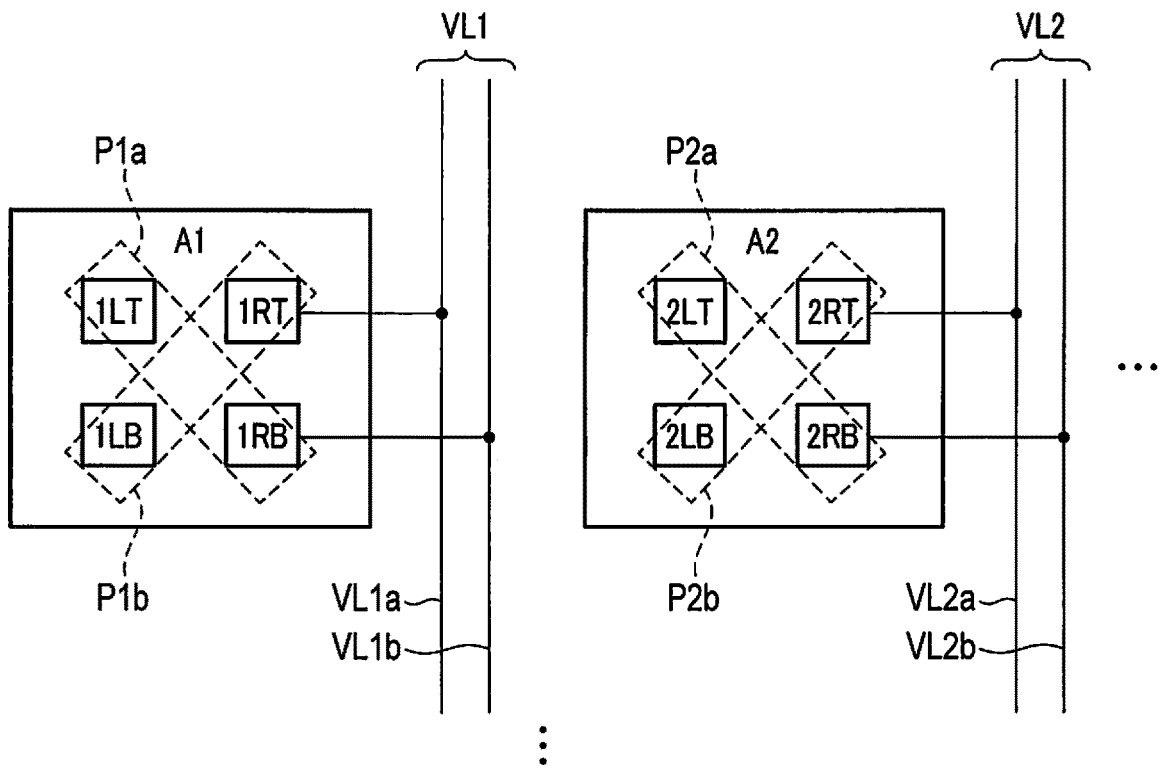
FIG. 20 is a view illustrating a third example of the connection configuration between the pixel array and vertical signal line groups at a time when four pixels are disposed in one pixel area.

FIG. 20 is a view illustrating a third example of the connection configuration between the pixel array 301 and vertical signal line groups at a time when four pixels are disposed in one pixel area.

In the third example, a pair of the upper left pixel and lower right pixel in the same pixel area is regarded as one pixel, and a pair of the lower left pixel and upper right pixel in the same pixel area is regarded as one pixel. The respective paired pixels are connected to common vertical signal lines of the corresponding vertical signal line group. For example, in a pixel area A1, an upper left pixel 1LT and a lower right pixel 1RB are connected, as a pixel P1*a*, to a vertical signal line VL1*b* of a vertical signal line group VL1, and a lower left pixel 1LB and an upper right pixel 1RT are connected, as a pixel P1*b*, to a vertical signal line VL1*a* of the vertical signal line group VL1. Similarly, in a pixel area A2, an upper left pixel 2LT and a lower right pixel 2RB are connected, as a pixel P2*a*, to a vertical signal line VL2*b* of a vertical signal line group VL2, and a lower left pixel 2LB and an upper right pixel 2RT are connected, as a pixel P2*b*, to a vertical signal line VL2*a* of the vertical signal line group VL2.

In the connection configuration as illustrated in FIG. 20, an addition signal of the upper left pixel and lower right pixel and an addition signal of the lower left pixel and upper right pixel are output from the pixel array 301. Accordingly, exactly the same components as in the above-described embodiment and modifications can be used for the S/H circuit 302, horizontal adders 303*a* and 303*b*, ADC/gain circuits 304*a* and 304*b*, VREFs 305*a* and 305*b*, digital memories 306*a* and 306*b*, output circuits 307*a* and 307*b* and reading control circuit 308, which are provided in the rear stage of the pixel array 301. Besides, in the connection configuration as illustrated in FIG. 20, a phase difference in an oblique direction in the screen can be detected in the focus detection unit 7.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:
1. An imaging apparatus comprising:
a pixel array in which a plurality pixels that generate electric charges based on incident light are arranged in a row direction and a column direction, the pixel array including a plurality of pairs of first pixels and second pixels, each pair of the first pixel and the second pixel being configured to receive a light flux passing through a photography optical system by pupil-dividing the light flux;
a first adder configured to add outputs of the first pixels and outputs of the second pixels, the first pixels and the second pixels being arranged in a direction of the pupil-dividing;
a second adder configured to generate a first output by adding the outputs of the first pixels arranged in the direction of the pupil-dividing, and configured to generate a second output by adding the outputs of the second pixels arranged in the direction of the pupil-dividing;
a first A/D converter circuit configured to convert an output of the first adder to a digital signal;
a second A/D converter circuit configured to convert an output of the second adder to a digital signal;
an image generating circuit configured to generate image data for display or image data for recording, by using an output from the first A/D converter circuit;
a focus detection circuit configured to execute focus detection by a phase difference detection method, based on the first output and the second output from the second A/D converter circuit; and a controller configured to control the image generating circuit and the focus detection circuit, wherein the controller is configured to operate the first adder and the second adder in parallel at a time of generating the image data for display and an output for a focus detection calculation, based on an output of the pixel array.

2. The imaging apparatus of claim 1, wherein the first A/D converter circuit is configured to amplify the output of the first adder with a first analog gain before converting the output of the first adder to the digital signal, and the second A/D converter circuit is configured to amplify the output of the second adder with a second analog gain which is different from the first analog gain, before converting the output of the second adder to the digital signal.

3. The imaging apparatus of claim 1, wherein the pair of the first pixel and the second pixel is formed in one pixel area, and the imaging apparatus further comprises a micro lens provided in accordance with the pixel area and configured to pupil-divide the light flux passing through the photography optical system, and to make the pupil-divided light fluxes incident on the first pixel and the second pixel.

4. The imaging apparatus of claim 1, wherein the first adder and the second adder include a plurality of addition switches configured to effect switching between a first state and a second state, the first state being a state in which the outputs of the first pixels and the outputs of the second pixels are added, the first pixels and the second pixels being arranged in the direction of the pupil-dividing, and the second state being a state in which a first output is generated by adding the outputs of the first pixels arranged in the direction of the pupil-dividing, and a second output is generated by adding the outputs of the second pixels arranged in the direction of the pupil-dividing.

5. The imaging apparatus of claim 1, wherein the controller is configured to operate the first A/D converter circuit and the second A/D converter circuit in parallel at a time of generating the image data for display and the output for the focus detection calculation, based on a one-time imaging output of the pixel array.

6. The imaging apparatus of claim 5, further comprising a display configured to display a live view, wherein the controller is configured to execute the live view and an operation of the focus detection circuit in parallel, based on the one-time imaging output of the pixel array.

7. A control method of an imaging apparatus comprising a pixel array in which a plurality pixels that generate electric charges based on incident light are arranged in a row direction and a column direction, the pixel array including a plurality of pairs of first pixels and second pixels, each pair of the first pixel and the second pixel being configured to receive a light flux passing through a photography optical system by pupil-dividing the light flux; a first adder configured to add outputs of the first pixels and outputs of the second pixels, the first pixels and the second pixels being arranged in a direction of the pupil-dividing; a second adder configured to generate a first output by adding the outputs of the first pixels arranged in the direction of the pupil-dividing, and configured to generate a second output by adding the outputs of the second pixels arranged in the direction of the pupil-dividing; a first A/D converter circuit configured to convert an output of the first adder to a digital signal; and a second A/D converter circuit configured to convert an output of the second adder to a digital signal, the control method comprising:

generating image data for display or image data for recording, by using an output from the first A/D converter circuit;

executing focus detection by a phase difference detection method, based on the first output and the second output from the second A/D converter circuit; and operating the first adder and the second adder in parallel at a time of generating the image data for display and an output for a focus detection calculation, based on an output of the pixel array.

8. The control method of claim 7, further comprising operating the first A/D converter circuit and the second A/D converter circuit in parallel at a time of generating the image data for display and the output for the focus detection calculation, based on a one-time imaging output of the pixel array.

9. The control method of claim 8, further comprising executing, when a live view is displayed, the live view and the focus detection in parallel, based on the one-time imaging output of the pixel array.

10. A computer-readable, non-transitory storage medium having stored thereon a control program of an imaging apparatus comprising a pixel array in which a plurality pixels that generate electric charges based on incident light are arranged in a row direction and a column direction, the pixel array including a plurality of pairs of first pixels and second pixels, each pair of the first pixel and the second pixel being configured to receive a light flux passing through a photography optical system by pupil-dividing the light flux; a first adder configured to add outputs of the first pixels and outputs of the second pixels, the first pixels and the second pixels being arranged in a direction of the pupil-dividing; a second adder configured to generate a first output by adding the outputs of the first pixels arranged in the direction of the pupil-dividing, and configured to generate a second output by adding the outputs of the second pixels arranged in the direction of the pupil-dividing; a first A/D converter circuit configured to convert an output of the first adder to a digital signal; and a second A/D converter circuit configured to convert an output of the second adder to a digital signal, the control program of the imaging apparatus comprising:

generating image data for display or image data for recording, by using an output from the first A/D converter circuit;

executing focus detection by a phase difference detection method, based on the first output and the second output from the second A/D converter circuit; and operating the first adder and the second adder in parallel at a time of generating the image data for display and an output for a focus detection calculation, based on an output of the pixel array.

11. The non-transitory storage medium of claim 10, wherein the control program of the imaging apparatus further comprises operating the first A/D converter circuit and the second A/D converter circuit in parallel at a time of generating the image data for display and the output for the focus detection calculation, based on a one-time imaging output of the pixel array.

12. The non-transitory storage medium of claim 10, wherein the control program of the imaging apparatus further comprises executing, when a live view is displayed, the live view and the focus detection in parallel, based on the one-time imaging output of the pixel array.

* * * * *